US011520888B2

(12) United States Patent
Grobman et al.

(10) Patent No.: US 11,520,888 B2
(45) Date of Patent: Dec. 6, 2022

(54) MULTI-DIMENSIONAL MALWARE ANALYSIS

(71) Applicant: McAfee, LLC, San Jose, CA (US)

(72) Inventors: Steven Grobman, Flower Mound, TX (US); Jonathan B. King, Hillsboro, OR (US); Yonghong Huang, Portland, OR (US); Amit Kumar, Bangalore (IN)

(73) Assignee: McAfee, LLC, San Jose, CA (US)

( * ) Notice: Subject to any disclaimer, the term of this patent is extended or adjusted under 35 U.S.C. 154(b) by 148 days.

(21) Appl. No.: 17/083,457

(22) Filed: Oct. 29, 2020

(65) Prior Publication Data

US 2022/0083662 A1    Mar. 17, 2022

(30) Foreign Application Priority Data

Sep. 15, 2020 (IN) .............................. 202041039840

(51) Int. Cl.
*G06F 21/56* (2013.01)
*G06N 20/00* (2019.01)
*G06F 21/54* (2013.01)

(52) U.S. Cl.
CPC ............ *G06F 21/566* (2013.01); *G06F 21/54* (2013.01); *G06F 21/568* (2013.01); *G06N 20/00* (2019.01)

(58) Field of Classification Search
CPC ..................................................... G06F 21/566
See application file for complete search history.

(56) References Cited

U.S. PATENT DOCUMENTS

| 11,003,773 | B1 * | 5/2021 | Fang | G06K 9/6262 |
| 11,170,104 | B1 * | 11/2021 | Stickle | G06N 20/00 |
| 2021/0303675 | A1 * | 9/2021 | Petersen | G06N 20/20 |

* cited by examiner

*Primary Examiner* — Simon P Kanaan
(74) *Attorney, Agent, or Firm* — Patent Capital Group

(57) ABSTRACT

There is disclosed in one example a computing apparatus, including: a hardware platform, including a processor, a memory, and a network interface; a bucketized reputation modifier table; and instructions encoded within the memory to instruct the processor to: perform a feature-based malware analysis of an object; assign the object a malware reputation according to the feature-based malware analysis; query and receive via the network interface a complementary score for a complementary property of the object; query the bucketized reputation modifier table according to the complementary score to receive a reputation modifier for the object; adjust the object's reputation according to the reputation modifier; and take a security action according to the adjusted reputation.

20 Claims, 17 Drawing Sheets

MULTI-DIMENSIONAL MALWARE ANALYSIS

CROSS-REFERENCE TO RELATED APPLICATIONS

This application claims priority to the Indian Provisional Application 202041039840 entitled "Multi-Dimensional Malware Analysis," filed 15 Sep. 2020, which is incorporated herein by reference.

FIELD OF THE SPECIFICATION

This application relates in general to computer security, and more particularly, though not exclusively, to providing a system and method of multi-dimensional malware analysis.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
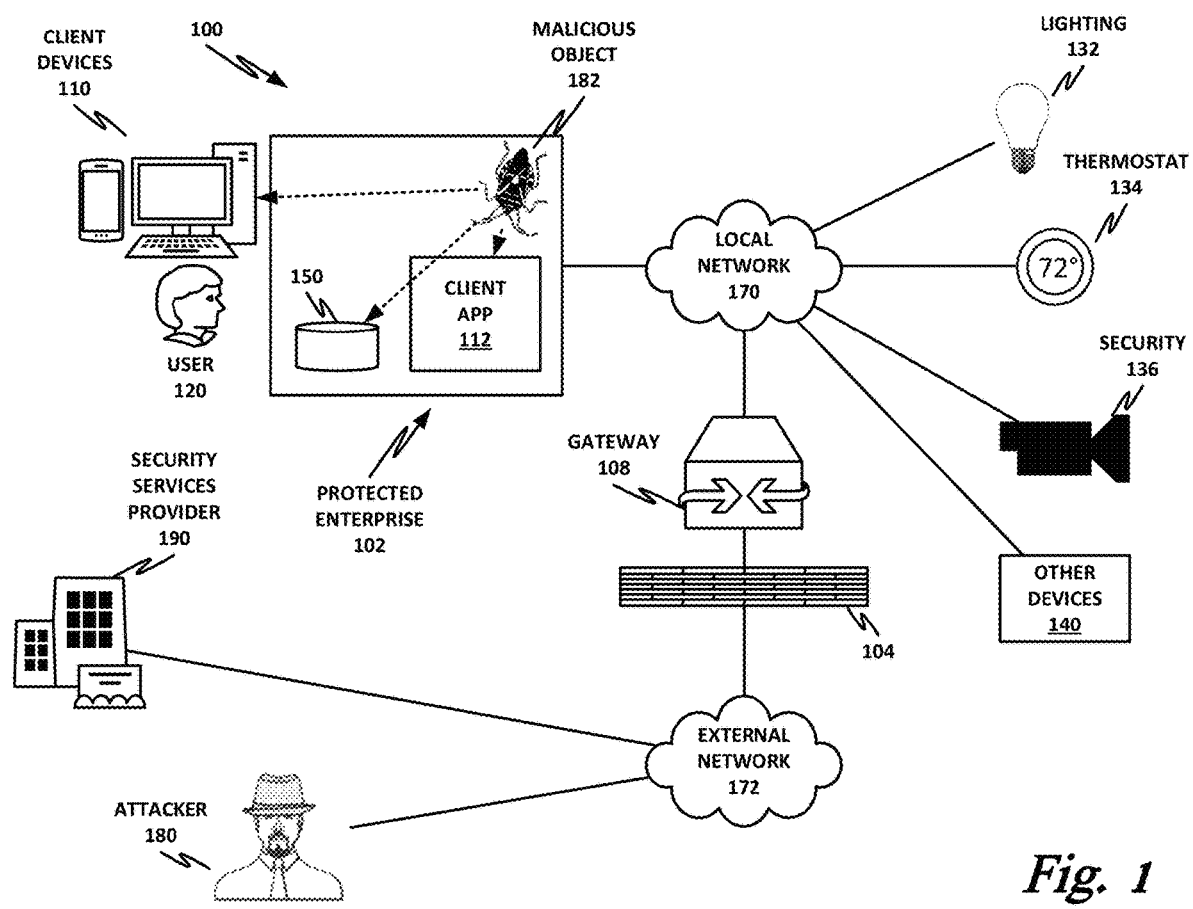
FIG. 1 is a block diagram illustration of selected elements of a security ecosystem.

In an example, there is disclosed a computing apparatus, comprising: a hardware platform, comprising a processor, a memory, and a network interface; a bucketized reputation modifier table; and instructions encoded within the memory to instruct the processor to: perform a feature-based malware analysis of an object; assign the object a malware reputation according to the feature-based malware analysis; query and receive via the network interface a complementary score for a complementary property of the object; query the bucketized reputation modifier table according to the complementary score to receive a reputation modifier for the object; adjust the object's reputation according to the reputation modifier; and take a security action according to the adjusted reputation.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Malware detection is difficult in the first place because of the large number of malware objects that appear in the wild on a daily basis, and in the second place because of the dynamic nature of malware, which leads to concept drift. There are many different approaches to malware analysis, including static analysis, dynamic analysis. Machine learning (including computer vision and natural language processing techniques) has been applied to malware detection to deal with large-scale data. However, most research only takes into account the characteristics of malware as a single source.

In static malware detection, a file to be analyzed may be, for example, a Windows portable executable (PE) file. In static analysis, for example, PE files may be parsed into static features. Heuristic rules or machine learning algorithms may be applied for pattern recognition to detect whether the object is malware. Static malware detection provides an important protection layer because, when successful, it blocks malicious files. Advantageously, the files are blocked before they are executed on an endpoint device. However, one limitation of some static analysis methods is that they are not accurate enough to achieve a desirable low false positive rate.

In contrast to static analysis, dynamic analysis is based on runtime behavior of an object. This dynamic analysis is often more reliable, with a lower false positive rate. However, when dynamic analysis is performed on an endpoint device, it requires file execution and time-dependent sequences of system calls for analysis. Because dynamic analysis on an endpoint requires file execution, there is both higher risk to the end user and increased resource consumption. It is therefore desirable to increase the accuracy of static analysis.

In embodiments of the present disclosure, a machine learning fusion framework leverages multiple sources for malware detection. The fusion mechanism may be based conceptually on the premise that multiple sources of data can boost the signal of malware detection, thus reducing false positives without sacrificing detection. In an embodiment, additional sources of data may be complementary to malware detection based on features such as static analysis. For example, one potential source of intelligence about an object is a uniform resource locator (URL) from which it originated. A security services provider such as MCAFEE, LLC may have a large database of URL reputations, and these reputations can be leveraged along with the output from their structural AI model to amplify the signal. This increases the confidence of a static or dynamic analysis and produces a better result, significantly reducing the error rate.

For example, if a potentially malicious file is downloaded from a particular URL, the URL trust or reputation may provide complementary information to infer whether the file is malicious or benign. In one example, a fusion model may be trained based on a large global database of URL reputations. The results of the fusion model may be used to identify new intercepts on a graph for binary classification tipping points. The tipping points may be initially derived from a model, but can be implemented with a simple lookup table. This moves much of the heavy processing to a backend, where available compute resources may be higher.

One practical application is to provide fusion model inputs as categorical or "bucketized" inputs, with another probabilistic classification assessment provided from a different comprehensive model.

For example, in one illustrative example, URL reputations are scored between 1 and 100. In this example, a score of 1 indicates a high probability that the URL is malicious, while a score of 100 represents a certainty, or near-certainty, that the URL is benign. On the other hand, a score of 50 may represent a URL whose reputation is unknown. Note that this score of 50 does not indicate that a URL is necessarily more malicious than a higher-scored URL, or less malicious than a lower-scored URL. It simply indicates that the reputation is unknown. Thus, it may not be beneficial to use the URL reputation itself as a direct input to a model. Rather, URL reputations may be bucketized, and a machine learning or mathematical model such as logistical regression may be used to compute a probability curve for that reputation bucket. The probability curve itself may be based on more detailed analysis of objects that belong to the bucket or class, which can be performed in a data center in the cloud, where greater compute resources may be available, along with other resources such as sandbox analysis.

Once these individual buckets have been identified, then logistic regression or a similar machine learning or mathematical model may be used to compute a probabilistic curve for each bucket. The probabilistic curve for each bucket is independent of each other bucket, but in general it is expected that the higher the reputation value, the more the statistical model will be "bent down" on the probabilistic curve.

Figure 2:
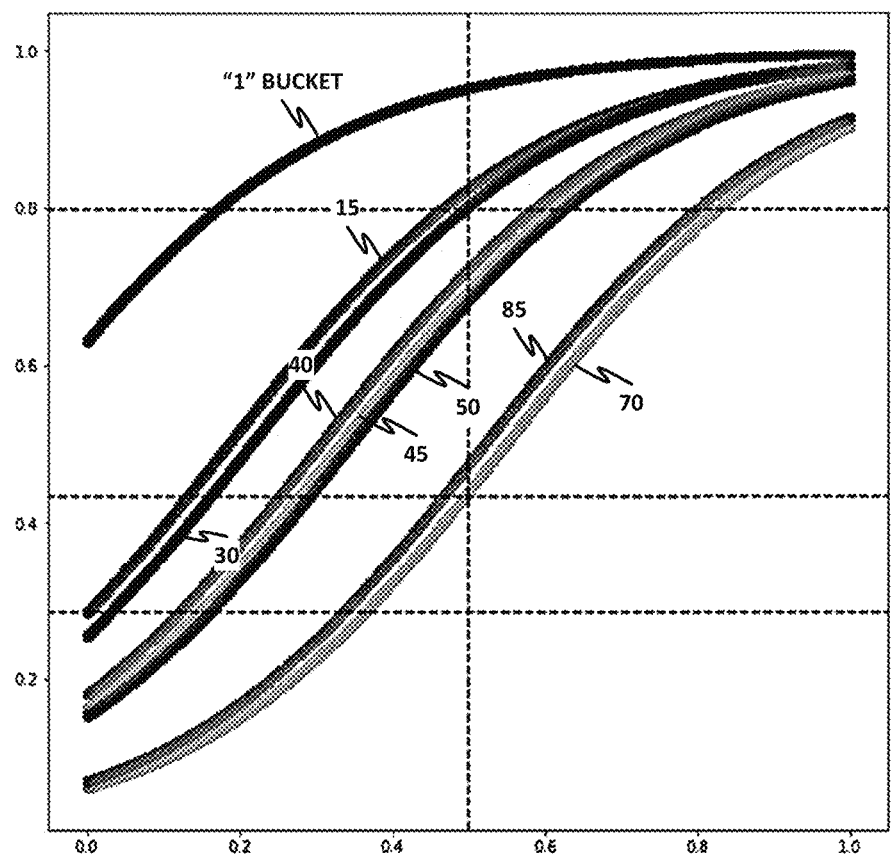
FIG. 2 is a graph illustrating a number of probabilistic curves for reputation buckets with differing thresholds.

An example of such a model is illustrated in FIG. 2, below. It can be seen in this FIGURE that the curve for the "1" reputation in the bucket is much "higher" on the graph than the curves for the 70 and 85 buckets. This means that if an object belongs to the "1" reputation bucket, there is a higher probability of it being malicious, even before any static analysis is performed. Thus, an object that comes from a URL that falls in this bucket may need to pass a higher threshold before it is deemed benign than an object that comes from the 70 or 85 URL buckets. If an object in the 1 has marginal, or even less-than-great static analysis result, it may be deemed malicious. On the other hand, an object from the 70 or 85 buckets with a marginal static analysis may be deemed safe because it comes from a much more reputable source.

Once the buckets have been defined, the bucket that an object belongs to may be encoded. For example, the source URL of an object may be queried in a global URL database, such as the Global Threat Intelligence (GTI™) database provided by MCAFEE, LLC, or some other database. Once the reputation of the URL has been returned, the reputation may be appropriately bucketized by assigning it to the bucket that the numerical reputation belongs to. For example, if the returned reputation is 25, the object may be assigned to the "15" bucket, which holds reputation values from 15 to 29. The reputation bucket could then be encoded, for example, using one-hot encoding in a 10-bit binary vector. This one-hot encoding can be used as a mask to assign the object to the appropriate line on a graph.

Intercepts can then be identified on the graph, based on detection thresholds. For example, in the graph of FIG. 2, the threshold for an object to be deemed "malicious" is an analysis score of 0.5 or greater. The regression curves for each reputation bucket may be placed on a graph with the analysis score being on the horizontal x-axis, and a fusion model score being on the vertical y-axis. In this example, both axes are scaled from 0 to 1. On the x-axis, 0 represents a 0% probability that the object is benign, while 1 represents a 100% probability that the object is benign. On the fusion model graph, a similar scale is used. Sensitivity thresholds may also be defined on the graph such as, for example, a 1% sensitivity located in FIG. 2 at approximately the 0.8 mark on the y-axis, a 3% sensitivity located a little above the 0.4 mark, and a 7% sensitivity located at approximately the 0.27 mark.

The values on the y-axis in this graph represent a numerical adjustment that should be made to the static analysis (or other analysis) score assigned to the object. For example, if an object falls within the 1 bucket for URL reputation, then it will need a very high analysis score to be considered benign. Looking, for example, at the point where the line for the 1 bucket crosses the 0.5 threshold for maliciousness, the object would need a score of almost 0.9 to be considered benign.

By accounting for the sensitivity values, a "crossover point" can be identified for each line, with each crossover value. This crossover point can be used as a numerical adjustment to the overall score, achieving quantitatively the same result that is achieved qualitatively by looking at the point where the regression curve meets the 0.5 threshold.

For example, if 1% sensitivity is used, then an object in the 1 bucket crosses over the sensitivity threshold at a value of approximately 0.1186. The modifier is derived by subtracting the original threshold of 0.5 from this crossover value (0.1186−0.5=−0.3814). This provides a numerical modifier of −0.3814. This value may be subtracted from the threshold of 0.5, yielding a new threshold of 0.8814 (0.5−(−0.3184)=0.8814). Thus, the object is considered benign only if it scores at least 0.8814 in the analysis. Conceptually, the same result is achieved by computing a reputation R from static analysis, and then adding the modifier to the result (R+(−0.3184)), and then comparing the modified reputation to the original threshold of 0.5

On the other hand, in this data set, the curve for 70 tracks closely with the curve for 85. In fact, counterintuitively, the 70 curve falls "below" the 85 curve on the graph. This could be the result, for example, of a limited data set, or some unexpected inputs in the data. However, this illustrates one reason why it is beneficial to bucketize the reputation ranges, and compute an independent probability curve for each reputation range.

Taking the curve for 85 as an example, and again using the 1% sensitivity, the 85 bucket curve crosses the threshold at 0.7725. Once again, the threshold value of 0.5 is subtracted from this, yielding an adjusted threshold of 0.2725. Again, this is used as a subtractive modifier for the calculated reputation. Thus, an object in this bucket with a 1% sensitivity is considered malicious only if it scores less than 0.2225 in the analysis. Note that conceptually, this can be considered either adjusting the threshold down by 0.2725 (new threshold is 0.2225), or adding the adjustment to the computed reputation (R+0.2725). The result is the same with either method.

Furthermore, the above method can be modified to an inverted system where the threshold is an upper limit rather than a lower limit (e.g., one in which 0 represents a 0% probability that the object is malicious, and 1 represents a 100% probability that the object is malicious). This can be accomplished, for example, by changing the signs of the operations.

Advantageously, because the regression curves may be calculated offline (e.g., in a data center), the final analysis can be performed on a machine with fewer compute resources. For example, the analysis could be performed on a client device, and the client device may query for a reputation for the URL that originated the file. The client device may then use a lookup table to determine which bucket the reputation should be assigned to, and what the appropriate adjustment is for that bucket.

This provides a machine learning-based framework with a simple lookup table from the fusion of a plurality of factors. The machine learning fusion framework leverages multiple sources for malware detection, and the regression plot generates a mapping hash table for simple lookups.

This achieves advantages over detection systems that use only static and/or dynamic analysis based on one source of data, such as static features or behavioral features associated with a specific cryptographic hash. These systems may use heuristic rule-based or machine learning approaches to generate a model to perform malware detection. Some of these models take into account only characteristics of the malware as a single source, but do not take into account the user's activities associated with the malware, which may be an additional source for malware detection.

Some systems use a graph-based machine learning algorithm and graph connection of more than one source, such as a device reputation to detect malware. However, this graph-based machine learning approach may be complex, and may be costly in terms of computation time to train the model. This may not be feasible for some constraints of malware detection, such as when detection is being performed on the client side where compute resources are limited, and there is a premium placed on not disrupting the user experience.

An advantage of the present disclosure is the use of a fusion framework to leverage multiple sources of data in a simple mechanism. This enables signals from multiple sources to be used for complementary detection. The fusion improves detection accuracy, but maintains low computational and storage costs. Because the design is simple, it is lightweight and feasible for client deployment.

The foregoing can be used to build or embody several example implementations, according to the teachings of the present specification. Some example implementations are included here as nonlimiting illustrations of these teachings.

There is disclosed in one example a computing apparatus, comprising: a hardware platform, comprising a processor, a memory, and a network interface; a bucketized reputation modifier table; and instructions encoded within the memory to instruct the processor to: perform a feature-based malware analysis of an object; assign the object a malware reputation according to the feature-based malware analysis; query and receive via the network interface a complementary score for a complementary property of the object; query the bucketized reputation modifier table according to the complementary score to receive a reputation modifier for the object; adjust the object's reputation according to the reputation modifier; and take a security action according to the adjusted reputation.

There is further disclosed an example computing apparatus, wherein the feature-based malware analysis comprises static analysis.

There is further disclosed an example computing apparatus, wherein the feature-based malware analysis comprises dynamic analysis.

There is further disclosed an example computing apparatus, wherein the complementary property is a reputation prediction of the object.

There is further disclosed an example computing apparatus, wherein the complementary property is an internet protocol (IP) address of the object.

There is further disclosed an example computing apparatus, wherein the complementary property is a certificate of the object.

There is further disclosed an example computing apparatus, wherein the complementary property is a uniform resource locator (URL) of the object.

There is further disclosed an example computing apparatus, wherein taking the security action comprises comparing the object's adjusted reputation to a malware threshold.

There is further disclosed an example computing apparatus, wherein adjusting the object's reputation comprises computing a difference between the threshold and the complementary score, and adjusting the object's reputation with the difference.

There is further disclosed an example computing apparatus, wherein the bucketized reputation modifier table comprises buckets for complementary score ranges.

There is further disclosed an example computing apparatus, wherein the complementary score ranges are of a non-uniform distribution.

There is further disclosed an example computing apparatus, wherein the buckets include reputation modifiers derived from models for the buckets.

There is further disclosed an example computing apparatus, wherein the buckets include options for a plurality of sensitivity thresholds.

There is further disclosed an example computing apparatus, wherein the models comprise a machine learning model.

There is further disclosed an example computing apparatus, wherein the models comprise a one-layer machine learning model.

There is further disclosed an example computing apparatus, wherein the models comprise a logistic regression model.

There is further disclosed an example computing apparatus, wherein the models comprise a multi-factor regression model, with a factor selected from the group consisting of URL, IP address, certificate, and reputation prediction.

There is also disclosed an example of one or more tangible, non-transitory computer-readable media having stored thereon executable instructions to instruct a processor to: receive a malware reputation score for a binary object; receive a secondary score for the binary object; query a bucketized table for a reputation adjustment factor for a range corresponding to the secondary score; adjust the reputation score with the reputation adjustment factor; compare the adjusted reputation score to a malware threshold; and take a security action according to the comparison.

There is further disclosed an example of one or more tangible, non-transitory computer-readable media, wherein the instructions are further to compute the malware reputation score.

There is further disclosed an example of one or more tangible, non-transitory computer-readable media, wherein the instructions are further to instruct the processor to perform feature-based malware analysis, including static analysis.

There is further disclosed an example of one or more tangible, non-transitory computer-readable media, wherein the instructions are further to instruct the processor to perform feature-based malware analysis, including dynamic analysis.

There is further disclosed an example of one or more tangible, non-transitory computer-readable media, wherein receiving the secondary score comprises querying a remote reputation database.

There is further disclosed an example of one or more tangible, non-transitory computer-readable media, wherein the reputation adjustment factor is a reputation prediction of the object.

There is further disclosed an example of one or more tangible, non-transitory computer-readable media, wherein the reputation adjustment factor is an internet protocol (IP) address of the object.

There is further disclosed an example of one or more tangible, non-transitory computer-readable media, wherein the reputation adjustment factor is a certificate of the object.

There is further disclosed an example of one or more tangible, non-transitory computer-readable media, wherein the reputation adjustment factor is a uniform resource locator (URL) of the object.

There is further disclosed an example of one or more tangible, non-transitory computer-readable media, wherein adjusting the reputation score comprises computing a difference between the threshold and the reputation adjustment factor, and adjusting the reputation score with the difference.

There is further disclosed an example of one or more tangible, non-transitory computer-readable media, wherein the bucketized table comprises buckets for complementary score ranges.

There is further disclosed an example of one or more tangible, non-transitory computer-readable media, wherein the complementary score ranges are of a non-uniform distribution.

There is further disclosed an example of one or more tangible, non-transitory computer-readable media, wherein the buckets include reputation modifiers derived from models for the buckets.

There is further disclosed an example of one or more tangible, non-transitory computer-readable media, wherein the buckets include options for a plurality of sensitivity thresholds.

There is further disclosed an example of one or more tangible, non-transitory computer-readable media, wherein the models comprise a machine learning model.

There is further disclosed an example of one or more tangible, non-transitory computer-readable media, wherein the models comprise a one-layer machine learning model.

There is further disclosed an example of one or more tangible, non-transitory computer-readable media, wherein the models comprise a logistic regression model.

There is further disclosed an example of one or more tangible, non-transitory computer-readable media, wherein the models comprise a multi-factor regression model, with a factor selected from the group consisting of URL, IP address, certificate, and reputation prediction.

There is also disclosed an example computer-implemented method of performing a malware classification, comprising: performing a first-phase feature-based analysis of an object, and assigning the object a first score; receiving from a reputation database a second score for a complementary property of the object; looking up a score adjustment factor according to the second score; modifying the first score according to the score adjustment factor to yield a final score; and comparing the final score to a malware threshold to determine if the object is malicious.

There is further disclosed an example computer-implemented method, wherein the first-phase feature-based malware analysis comprises static analysis.

There is further disclosed an example computer-implemented method, wherein the first-phase feature-based malware analysis comprises dynamic analysis.

There is further disclosed an example computer-implemented method, wherein the complementary property is a reputation prediction of the object.

There is further disclosed an example computer-implemented method, wherein the complementary property is an internet protocol (IP) address of the object.

There is further disclosed an example computer-implemented method, wherein the complementary property is a certificate of the object.

There is further disclosed an example computer-implemented method, wherein the complementary property is a uniform resource locator (URL) of the object.

There is further disclosed an example computer-implemented method, wherein determining that the object is malicious triggers a security action.

There is further disclosed an example computer-implemented method, wherein the reputation database comprises a lookup table of buckets for complementary score ranges.

There is further disclosed an example computer-implemented method, wherein the complementary score ranges are of a non-uniform distribution.

There is further disclosed an example computer-implemented method, wherein the lookup table of buckets includes reputation modifiers derived from models for buckets.

There is further disclosed an example computer-implemented method, wherein the lookup table of buckets includes options for a plurality of sensitivity thresholds.

There is further disclosed an example computer-implemented method, wherein the models comprise a machine learning model.

There is further disclosed an example computer-implemented method, wherein the models comprise a one-layer machine learning model.

There is further disclosed an example computer-implemented method, wherein the models comprise a logistic regression model.

There is further disclosed an example computer-implemented method, wherein the models comprise a multi-factor regression model, with a factor selected from the group consisting of URL, IP address, certificate, and reputation prediction.

There is further disclosed an example apparatus comprising means for performing the method of a number of the above examples.

The is further disclosed an example apparatus, wherein the means for performing the method comprise a processor and a memory.

There is further disclosed an example apparatus, wherein the memory comprises machine-readable instructions that, when executed, cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

A system and method for providing multi-dimensional malware analysis will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a stand-alone internet appliance. Such embodiments are popular in cases in which ecosystem 100 includes a home or small business. In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the Global Threat Intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

FIG. 2 is a graph illustrating a number of probabilistic curves for reputation buckets with differing thresholds, as described above.

Figure 3A:
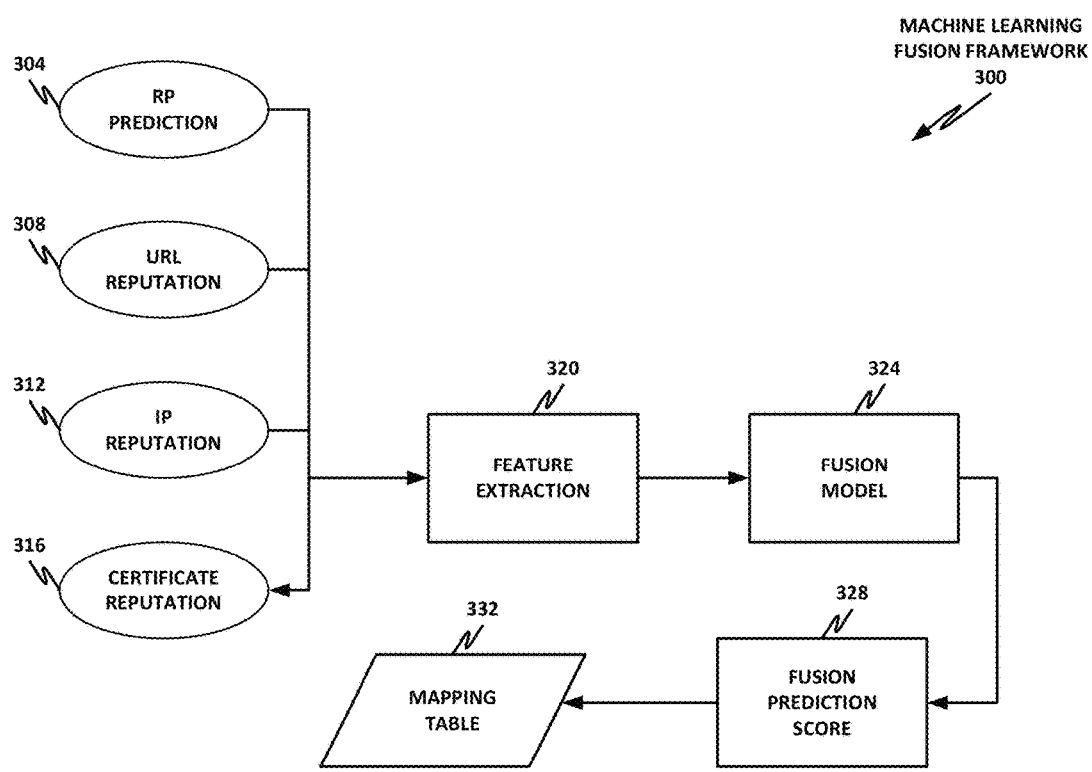
FIG. 3*a* is a block diagram illustration of a machine learning fusion framework.

FIG. 3a is a block diagram illustration of a machine learning fusion framework 300. Machine learning fusion framework 300 leverages multiple sources to provide large-scale malware detection. This relies, in part, on the principle that different sources can provide complementary signals to contribute to malware detection.

In this illustration, a plurality of input sources are provided, including a reputation prediction (RP), which provides a malware prediction score 304, a URL reputation 308, an IP address reputation 312, and a certificate reputation 316. These are provided by way of illustration only, and other factors could also be considered. Some or all of these factors may be considered together to compute a score adjustment factor for a particular binary object, and one or more of these may be used to augment the result of a local analysis, such as static analysis, which may itself provide an RP value.

The score adjustment factor may be based on a single one of the factors listed here, or on a plurality of factors. For example, binary objects associated with a particular URL, IP address, or certificate may be assigned a composite reputation, which can be used as a reputation adjustment factor, or as an input into a reputation adjustment factor algorithm. The algorithm may be more or less complex, depending on the number of factors used. The output of the algorithm is a final score adjustment factor to be assigned to a class of objects. For example, where a plurality of factors are used to compute the final reputation adjustment factor, the output may be indexed according to URL. While it is possible to compute an adjustment factor "on the fly" according to the plurality of inputs, advantages may be realized in some embodiments by storing the reputation adjustment factors in the lookup table, indexed by a single input. For example, if an endpoint device is analyzing an object, there may be advantages in performing the more heavy-duty reputation adjustment computations on a different device, such as in a large data center or cloud, where heavy-duty or special purpose resources such as large processor banks and accelerators are available. Such a data center may also have access to a larger database of objects to inform its analysis. The endpoint device can then receive a binary object, perform local analysis (such as static analysis) on the object, look up a simple reputation adjustment factor according to, for example, a URL associated with the object, and adjust the score accordingly.

As illustrated in the framework of FIG. 3a, a plurality of inputs such as RP 304, URL reputation 308, IP reputation 312, and certificate reputation 316 may be provided to a feature extraction block 320.

In feature extraction block 320, the system takes the input, for example, of RP prediction 304 and URL reputation 308. Other reputations may be used. In the case of an RP prediction, the URL reputation may be in the range of [−127, 127]. In this example, the higher the reputation, the more malicious the URL is. On the other hand, the URL trust may be in the range of [1, 100]. In this case, the higher the trust score, the less malicious the URL is. In feature extraction 320, either the URL reputation or the URL trust score may be used, or some other score.

Using the URL trust as a reputation, the URL trust score may be transformed into a categorical feature using one-hot encoding. For example, there are N buckets in the URL trust. This may be converted into 10 bits of binary (0 or 1) feature vectors, as illustrated in Table 1, below:

TABLE 1

Example Ranges for Bucketized Reputations

| Bucket: | 1 | 2 | 3 | 4 | 5 | 6 | 7 | 8 | 9 | 10 |
|---|---|---|---|---|---|---|---|---|---|---|
| Range: | 0-14 | 15-29 | 30-39 | 40-44 | 45-49 | 50-69 | 70-84 | 85-98 | 99 | 100 |

Note that the distribution of reputations need not be uniform. In this example, the reputations do not even follow a particular pattern. Instead, they may be distributed according to empirical observations.

Feature extraction block 320 may include circuitry and logic to provide to fusion model 324. Fusion model 324 may include a machine learning or other mathematical engine. Fusion model 324 uses the one or more inputs to compute a fusion prediction score 328. Fusion prediction score 328 may be or include a reputation adjustment factor that includes a fusion of the plurality of inputs. This provides a weighted "prediction" that can be used to weight or adjust a local analysis score, such as a reputation score computed via static analysis on an endpoint device.

The feature dimension for the fusion model is N+1, where the N dimension is from the URL categorical feature, and the "1" dimension is from the RP prediction score.

Figure 3B:
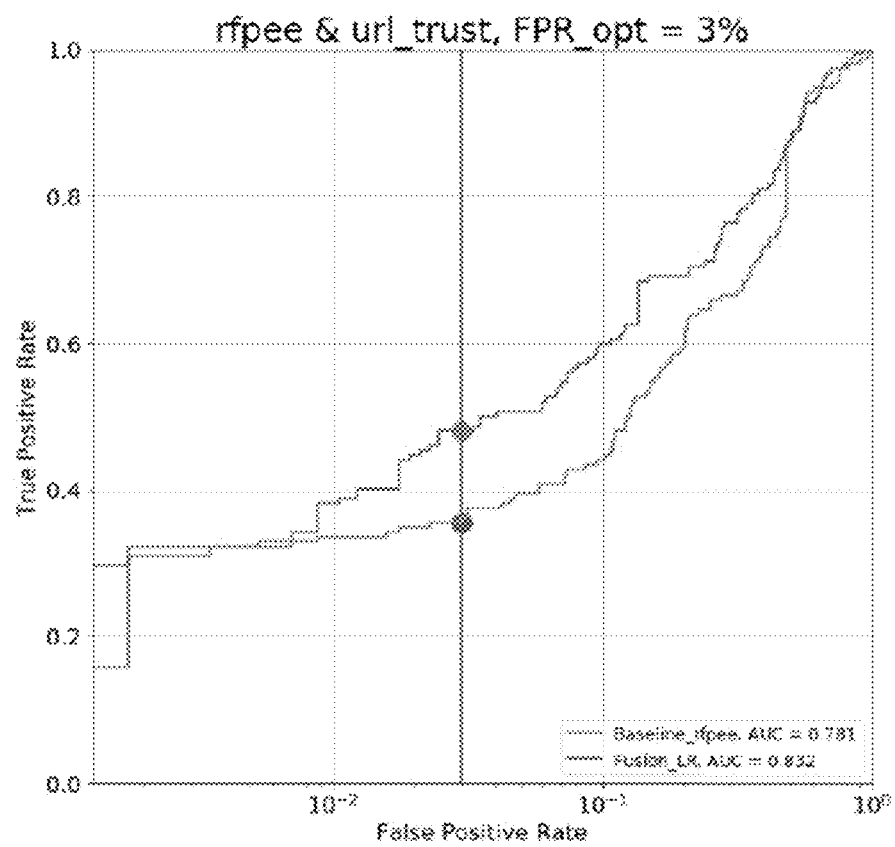
FIG. 3*b* is a graph illustrating a receiver operating characteristic (ROC) curve, based on a fusion prediction score.

In fusion model 324, artificial intelligence, machine learning (e.g., a convolutional neural network (CNN), including a single-layer CNN) or a more straightforward function such as logistic regression may be used. This function takes an input from the RP prediction score and URL trust to make an inference. The function used in fusion model 324 may be known as a fusion classifier. In this block, a file hash of the object may be associated with a URL source, giving access to the URL reputation associated with the binary object. This may then be applied to the fusion based on two or more inputs, such as RP prediction score and URL reputation or trust. The number of factors used may determine the number of dimensions of the lookup table. Based on the fusion prediction score, a receiver operating characteristic (ROC) curve may be plotted, as illustrated in FIG. 3b.

Three separate operating points may be selected, which may be associated with product sensitivity thresholds for a false positive rate (FPR). The product may increase or decrease the number of sensitivity thresholds based, for example, on user experience guidance. The three thresholds used here as an example correspond to high, medium, and low sensitivity levels.

Fusion prediction score 328 is provided to a mapping table 332. To generate mapping table 332, a "candy plot" may be used to describe the relationship between the RP prediction scores, the URL trust, and the fusion scores. This plot holds one of the fusion model inputs constant, so that the result can be graphed with the resulting output as a function curve. An example candy plot is shown in FIG. 2.

Furthermore, mapping table 332 may include the fusion prediction score, and may be indexed according to one or more of the inputs, such as according to RP prediction 304, URL reputation 308, IP reputation 312, or certificate reputation 316. Furthermore, mapping table 332 could include a multi-dimensional lookup, such as a multi-dimensional array including two indices. This could allow an endpoint device to look up a reputation adjustment according to two or more inputs, which may allow for greater refinement in mapping table 332, at the cost of some further complexity. The appropriate balance between refinement and complexity may depend on the needs of a particular embodiment.

By plotting the functional response of the fusion model against the baseline machine learning score model, intersection points of the fusion model may be leveraged at the desired fusion model operating points. These may be correlated with the output of the baseline machine learning model. Based on the intersects of the three thresholds (horizontal lines) and URL trust scores (sigmoid curves), the RP prediction scores can be read and a mapping table can be generated, as shown in Table 2. Table 2 also illustrates the realized improvement to malware predictions for each sensitivity threshold, or a true positive rate (TPR), using the present method.

TABLE 2

Mapping Table

| | 1 | 15 | 30 | 40 | 45 | 50 | 70 | 85 | TPR IMPROVEMENT |
|---|---|---|---|---|---|---|---|---|---|
| FPR = 1.0% | 0.1186 | 0.5587 | 0.4282 | 0.4114 | 0.5405 | 0.5414 | 0.7874 | 0.7725 | 0.0461 |
| FPR = 3.0% | 0.0000 | 0.2908 | 0.1604 | 0.1435 | 0.2725 | 0.2734 | 0.5196 | 0.5047 | 0.125 |
| FPR = 7.0% | 0.0000 | 0.1573 | 0.0269 | 0.01 | 0.139 | 0.1399 | 0.386 | 0.3711 | 0.1316 |

Advantageously, by bucketizing the URL reputation into discrete buckets, the fusion model response curves can be computed. Then, the intersection points with the desired operating points can be computed. The baseline model responsiveness can then be "bent," based on the secondary point of information being accounted for. This allows the system to take advantage of incrementally better detection rates of the fusion model, with very little client footprint or performance impact.

In an illustrative example, on each hash at the client side, the system may query the RP prediction score and check with the mapping table. If it is higher than the threshold, the file is detected as malicious. If lower than the threshold, it is detected as benign.

Figure 4:
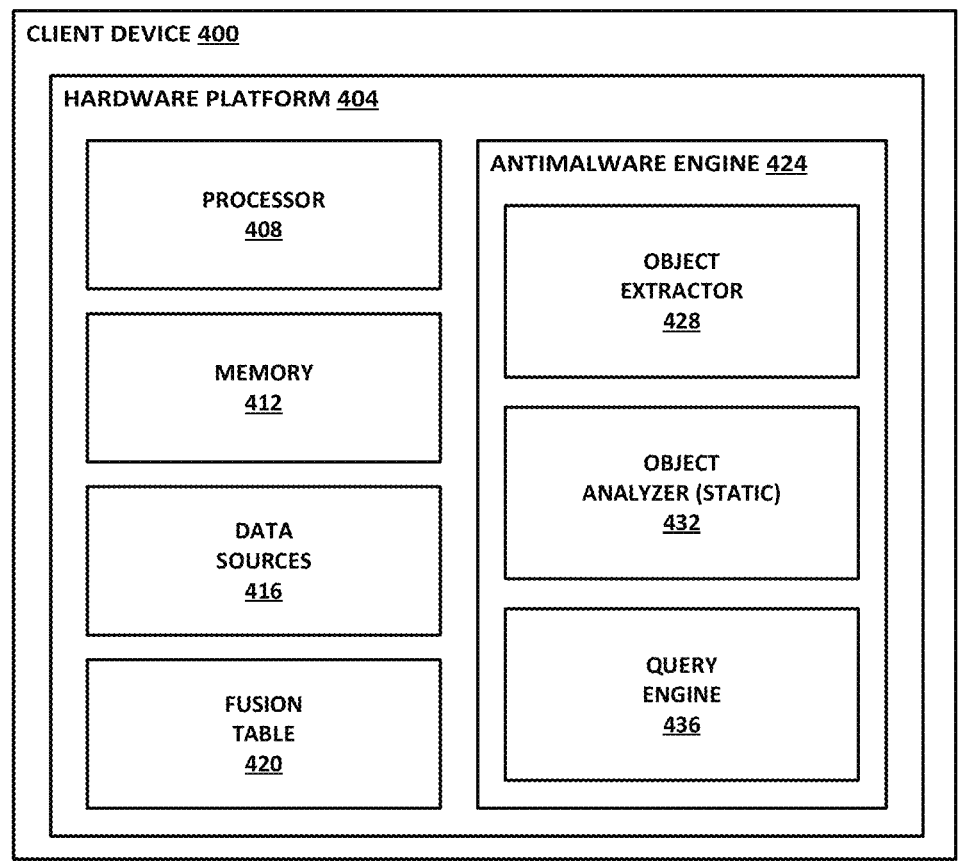
FIG. 4 is a block diagram of a client device.

FIG. 4 is a block diagram of a client device 400. Client device 400 may include or may be based on a hardware platform, such as the hardware platforms illustrated in FIGS. 8-10 below.

Client device 400 could be an endpoint device, such as a laptop or desktop computer, an enterprise server, an enterprise gateway, or some other device found within an enterprise. In common practice, client device 400 may have substantially fewer computing resources available than a large server bank in a data center. It may, therefore, be desirable to offload some compute functions—especially heavy-duty compute functions—to a more capable device. However, client device 400 may include sufficient capabilities to perform some analysis.

Client device 400 includes a hardware platform 404, which includes, for example, a processor 408 and a memory 412. Examples of hardware platforms with processors and memories are disclosed in further detail below.

Hardware platform 404 also hosts data sources 416, which may include sensors, network connections, APIs, or other interfaces for receiving data about the network. This could include APIs for scanning a local disk for unknown objects, or for receiving, via network interfaces, reports of unknown objects from enterprise devices.

In this example, client device 400 also includes a fusion table 420, which may be pre-populated with data, for example, from a security services provider such as SSP 190 of FIG. 1. Fusion table 420 includes one or more indices into fusion prediction scores, which provide reputation adjustment factors.

Client device 400 also includes an anti-malware engine 424. Anti-malware engine 424 includes, for example, an object extractor 428, which may be used to extract data or features from a newly identified object, or to extract the object itself, such as via unpacking, unzipping, or otherwise making the object available for analysis.

Object analyzer 432 may include some analysis capabilities. For example, object analyzer 432 may perform static analysis on the object, or other analysis appropriate to the capabilities of client device 400. In this example, the analysis performed by object analyzer 432 may have a certain level of confidence, but it may be desirable to increase the confidence in the analysis performed by object analyzer 432.

Query engine 436 may be used to query a fusion table 420, or alternatively, to provide a remote query to a security services provider, such as security services provider 190 of FIG. 1. The result of the query may be a reputation adjustment factor that can then be provided back to object analyzer 432. Object analyzer 432 can then use the reputation adjustment factor to adjust the computed reputation of the object, and then make decisions about how to handle the object. For example, if the reputation does not meet a certain threshold, then a security action may be taken, such as quarantining the object, providing the object to a security services provider for additional analysis, removing the object, sandboxing the object, or performing some other security action.

Figure 5:
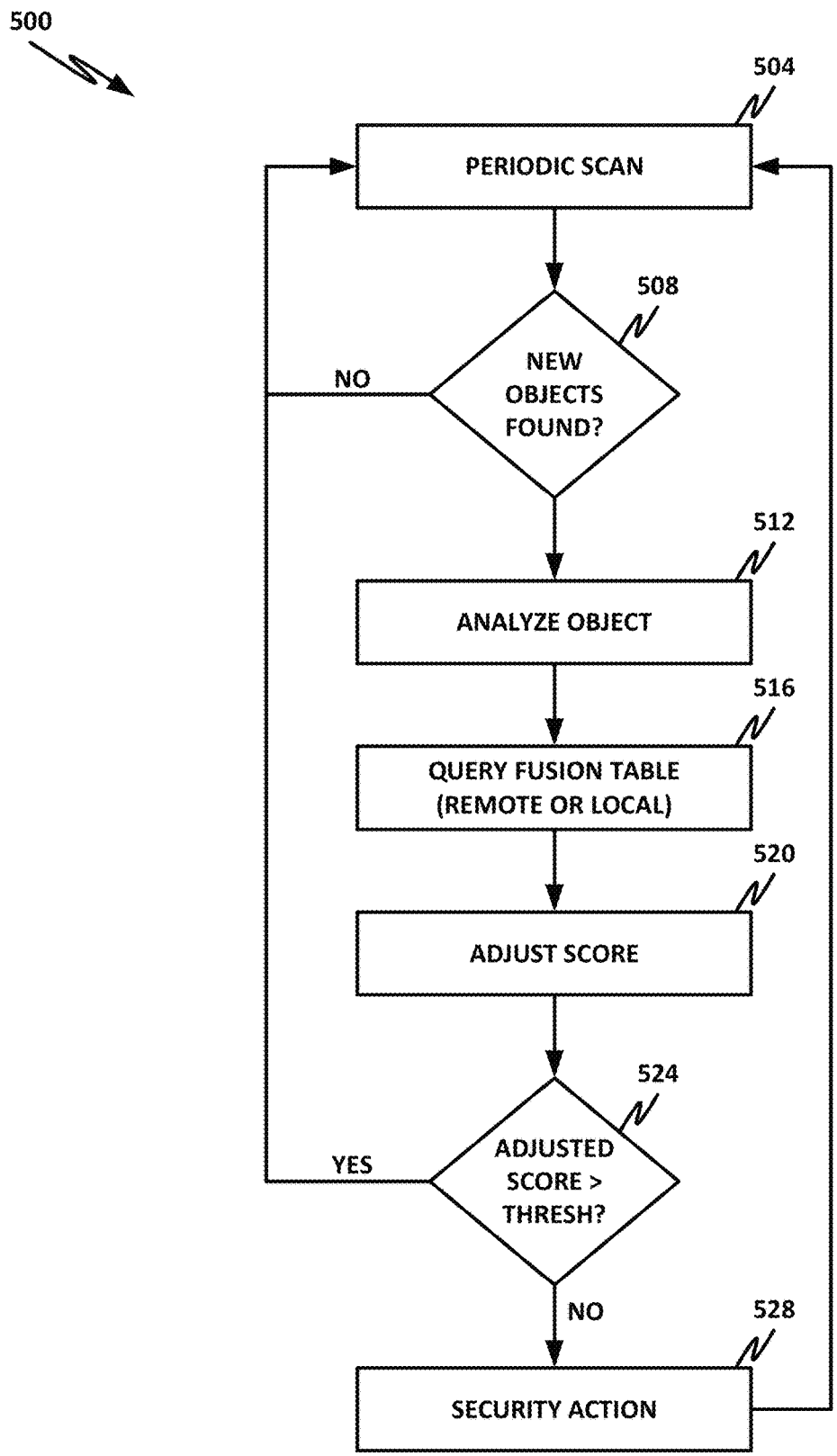
FIG. 5 is a flowchart of a method performed, for example, by a client device.

FIG. 5 is a flowchart of a method 500 performed, for example, by a client device.

Starting in block 504, the device does a periodic scan, a periodic collection, or is triggered, for example, by an interrupt. This periodic scan or other activity results in the identification of binary objects on the device, in the network, or within the enterprise.

In decision block 508, the device determines whether one or more new objects have been found, and require analysis.

If no analysis is required, then in block 504, the object waits for its next-scheduled or interrupt-driven scan or notification.

Returning to decision block 508, if new objects have been found and require analysis, then in block 512, the system begins operating on the objects. For example, the system selects one object for analysis, and then performs the analysis, which may include static analysis or other analysis, such as dynamic analysis or sandbox analysis.

The result of the analysis of block 512 is a reputation prediction score, which indicates how trustworthy the object is on the enterprise. However, as described above, this trustworthiness may be further enhanced by considering other inputs, such as a URL associated with the object (e.g., a URL from which the object was downloaded), or other metadata about the object. In block 516, one or more metadata features of the object are used to query a table, which could be either local or remote. The query returns a reputation prediction adjustment for the object, based at least in part on the metadata query.

In block 520, the system adjusts the RP score according to the provided RP adjustment from the fusion table.

In decision block 524, the system determines whether the adjusted score meets a reputation threshold. For example, if the adjusted score is greater than the reputation threshold, then the object is treated as safe, and is allowed to operate normally on the network. If the adjusted score is less than the threshold, then the object may be treated as a security threat or a potential security threat, and additional action may be taken, to include providing additional analysis, and/or evicting the object.

Thus, if the object has a sufficient reputation, then the system returns to block 504, and again waits for the next periodic scan or interrupt.

If the object does not have a sufficient reputation, then in block 528, the system takes some security action on the object, and then returns to block 504.

Figure 6:
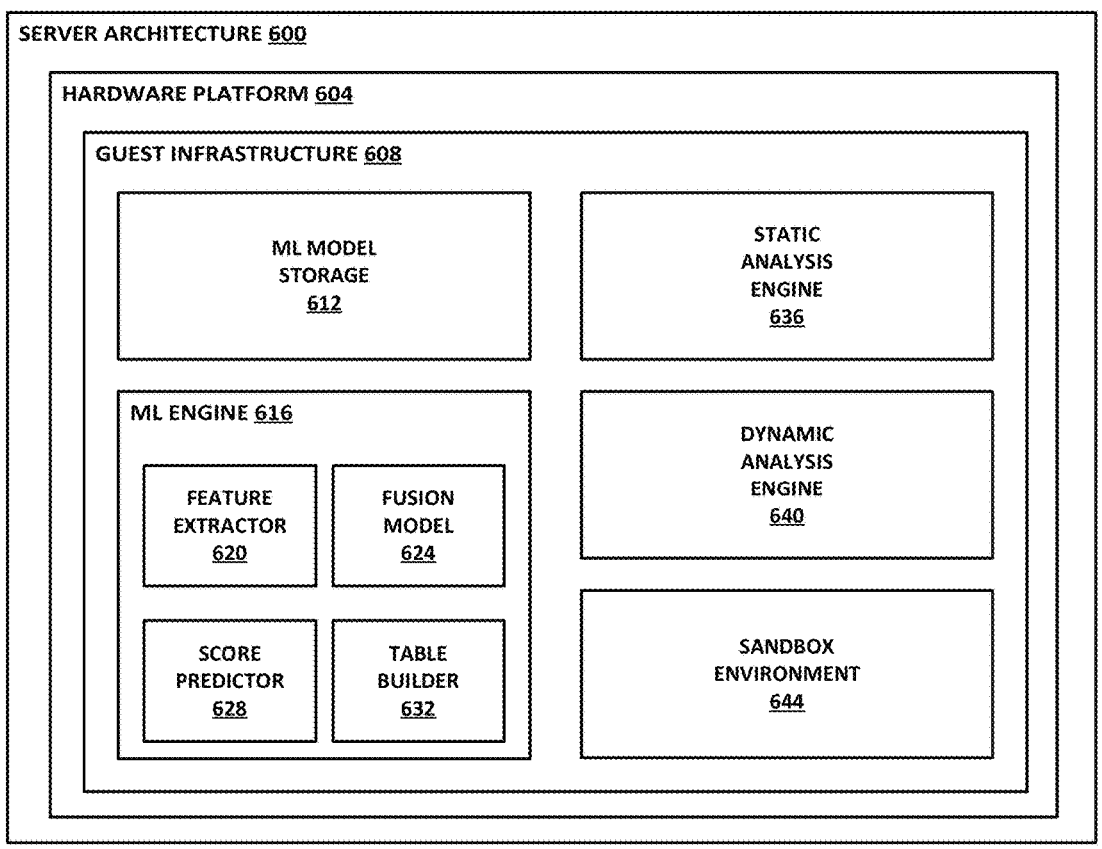
FIG. 6 is a block diagram of selected elements of a server architecture.

FIG. 6 is a block diagram of selected elements of a server architecture 600. Server architecture 600 may be hosted, for example, in an enterprise data center, in a cloud data center, or in any other hardware or software environment. Server architecture 600 provides a hardware platform 604, which may provide compute resources such as processors, memories, storage, accelerators, and similar. Although it is not required, in common usage (particularly in the case of a data center), hardware platform 604 need not necessarily be a standalone computer. Rather, hardware platform 604 could be a blade server, a rackmount server, or some other architecture.

In this illustration, hardware platform 604 provides a guest infrastructure 608. Guest infrastructure 608 could provide, for example, virtualization or containerization of resources for hardware platform 604.

Within guest infrastructure 608, various guests are allocated. In this example, these are shown as separate or distinct guests, although the divisions are a matter of skill in the art, and divisions different from those shown may be used.

In this case, a machine model storage 612 is provided. This is used to store existing machine models, including training parameters for a machine learning system.

Machine learning engine 616 includes various machine learning features, such as a feature extractor 620, a fusion model 624, a score predictor 628, and a table builder 632. The elements of machine learning engine 616 may be configured, for example, to carry out the pipeline features illustrated in machine learning fusion framework 300 of FIG. 3a, or some other pipeline or algorithm consistent with the teachings of the present specification. For example, feature extractor 620 could provide feature extraction 320 of FIG. 3a, fusion model 624 could provide fusion model 324 of FIG. 3a, score predictor 628 could provide fusion prediction score 328 of FIG. 3a, and table builder 632 could build mapping table 332 of FIG. 3a. Other configurations could also be provided.

In block 636, a static analysis engine is provided. This may be used as a supplemental malware detection agent, and may provide some data that are inputs into machine learning engine 616. Static analysis engine 636 may analyze static binary objects to detect their features. This could include reverse engineering, decompilation, visual analysis of the binary, or other operations.

Dynamic analysis engine 640 may perform dynamic analysis of objects, and may also contribute to data such as reputation scores, which may be used as inputs to machine learning engine 616. Dynamic analysis engine 640 may be configured to run code, such as in a sandbox environment 644, and to analyze the behavior of the running code. This behavioral analysis can be used to detect malicious activity, apart from or in addition to the results of static analysis engine 636.

Figure 7:
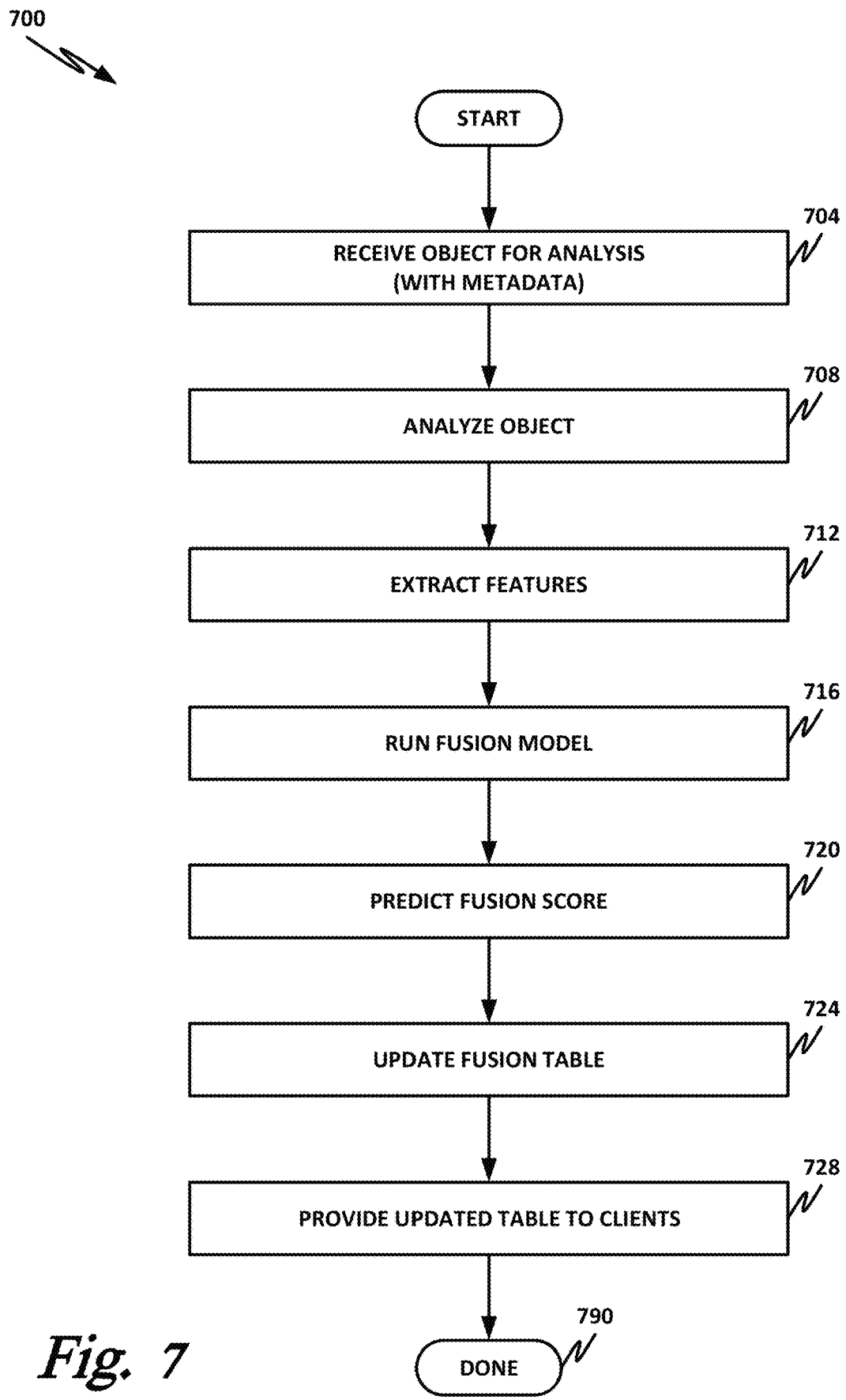
FIG. 7 is a flowchart of a method that may be performed, for example, by a machine learning engine.

FIG. 7 is a flowchart of a method 700. Method 700 may be performed, for example, by machine learning engine 616 of FIG. 6, or by some other suitable agent.

Starting in block 704, the system receives an object for analysis. This object may include metadata. For example, the object may be a binary executable, a portable executable, or some other binary file. Metadata may include, for example, a URL from which the file was received, or other information, such as a machine that originated the object, the credentials of a user who provided the object, or some other metadata that may be used to associate with the object under analysis. In some examples, these metadata tags may be used as additional indices into a fusion model table.

In block 708, the system analyzes the object, which may include assigning it a preliminary reputation.

In block 712, the system extracts features, as illustrated in connection with block 320 of FIG. 3a. In block 716, the system runs the fusion model on the object, which may provide additional information about the reputation of the object. This may include the operations of fusion model 324 of FIG. 3a.

In block 720, the system predicts a fusion score, which fits into the architecture of the fusion table. This may correspond to the operations of block 328 of FIG. 3a.

In block 724, now that a fusion score has been predicted or updated, the fusion table may be updated with the new fusion score. This may correspond to block 332 of FIG. 3a.

Now that an updated fusion table is available, in block 728, the server system provides the updated fusion table to client devices. The client devices may now use the updated fusion table to run their own local analysis against the fusion table. This enables the client devices to provide higher-reliability malware prediction results without providing a substantial additional workload on the client devices, which may have more limited compute resources.

In block 790, the method is done.

Figure 8:
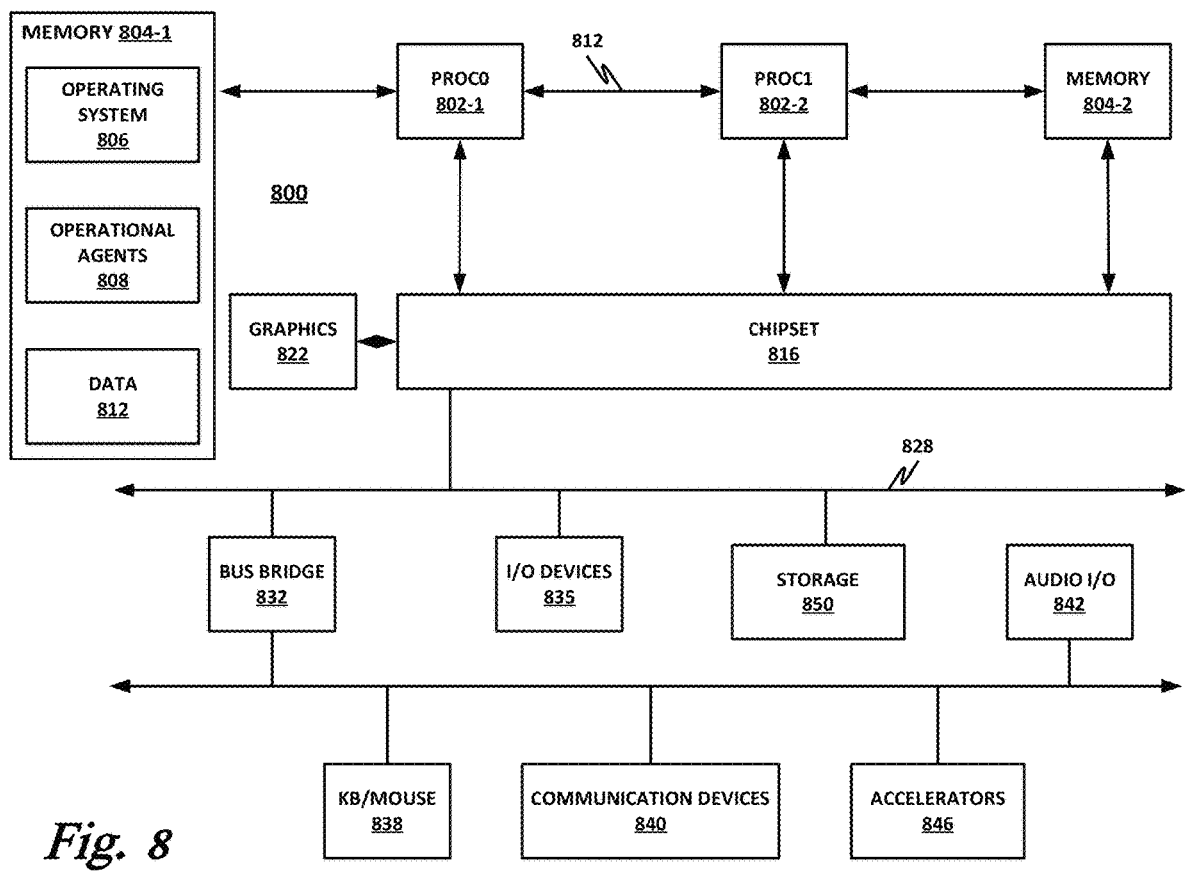
FIG. 8 is a block diagram of selected elements of a hardware platform.

FIG. 8 is a block diagram of a hardware platform 800. In at least some embodiments, hardware platform 800 may be programmed, configured, or otherwise adapted to provide multi-dimensional malware analysis, according to the teachings of the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 800, even though they may be scattered across a data center, or even located in different data centers.

Hardware platform 800 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high-performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, IP telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 800 is arranged in a point-to-point (PtP) configuration. This PtP configuration is popular for personal computer (PC) and server-type devices, although it is not so limited, and any other bus type may be used.

Hardware platform 800 is an example of a platform that may be used to implement embodiments of the teachings of this specification. For example, instructions could be stored in storage 850. Instructions could also be transmitted to the hardware platform in an ethereal form, such as via a network interface, or retrieved from another source via any suitable interconnect. Once received (from any source), the instructions may be loaded into memory 804, and may then be executed by one or more processor 802 to provide elements such as an operating system 806, operational agents 808, or data 812.

Figure 10:
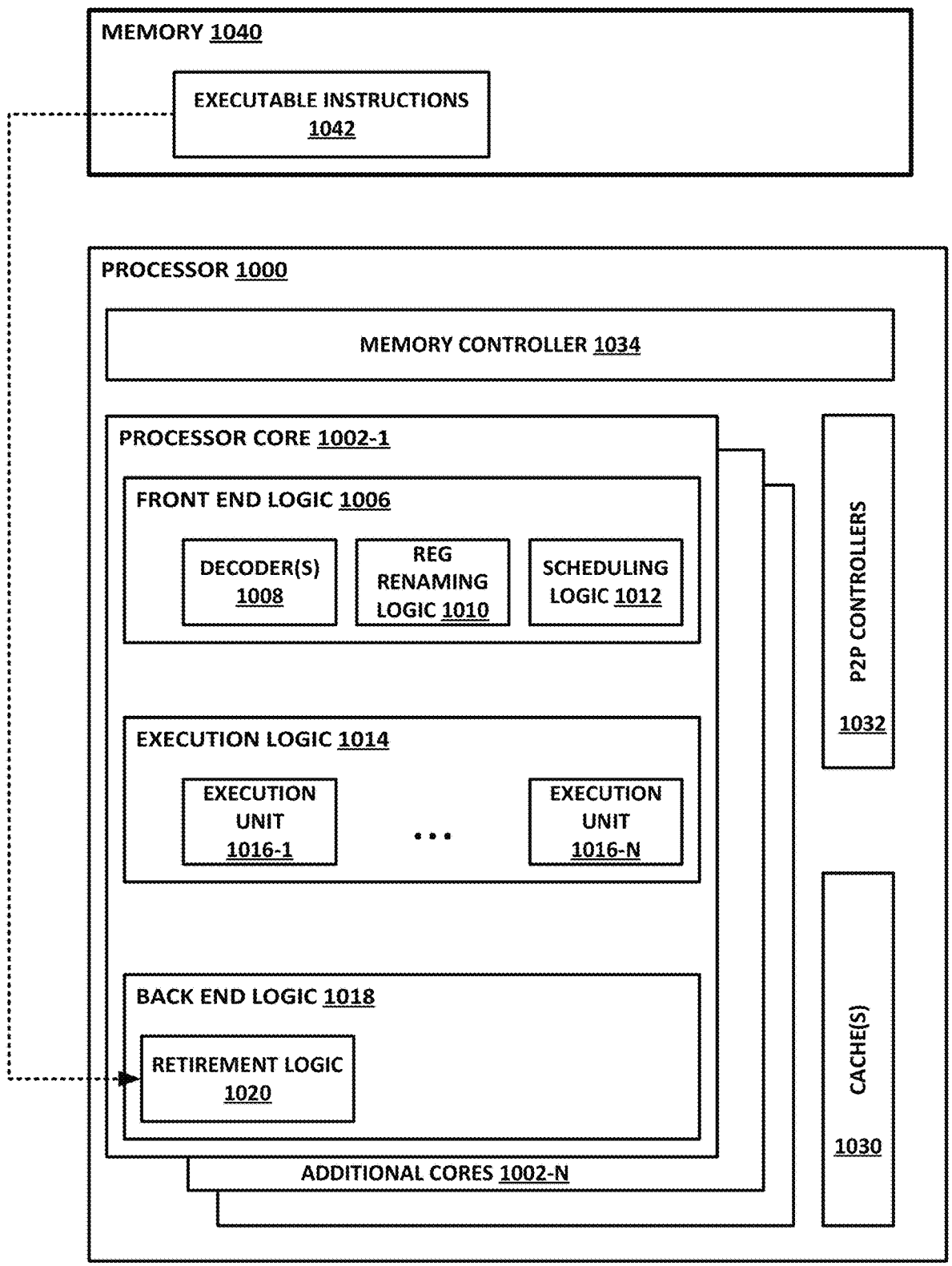
FIG. 10 is a block diagram of selected elements of a processor.

Hardware platform 800 may include several processors 802. For simplicity and clarity, only processors PROC0 802-1 and PROC1 802-2 are shown. Additional processors (such as 2, 4, 8, 16, 24, 32, 64, or 128 processors) may be provided as necessary, while in other embodiments, only one processor may be provided. Details of processors 802 are not illustrated in this FIGURE, but one embodiment is illustrated in FIG. 10. Processors may have any number of cores, such as 1, 2, 4, 8, 16, 24, 32, 64, or 128 cores.

Processors 802 may be any type of processor and may communicatively couple to chipset 816 via, for example, PtP interfaces. Chipset 816 may also exchange data with other elements, such as a high-performance graphics adapter 822. In alternative embodiments, any or all of the PtP links illustrated in FIG. 8 could be implemented as any type of bus, or other configuration rather than a PtP link. In various embodiments, chipset 816 may reside on the same die or package as a processor 802 or on one or more different dies or packages. Each chipset may support any suitable number of processors 802. A chipset 816 (which may be a chipset, uncore, Northbridge, Southbridge, or other suitable logic and circuitry) may also include one or more controllers to couple other components to one or more central processor units (CPU).

Two memories, 804-1 and 804-2 are shown, connected to PROC0 802-1 and PROC1 802-2, respectively. As an example, each processor is shown connected to its memory in a direct memory access (DMA) configuration, though other memory architectures are possible, including ones in which memory 804 communicates with a processor 802 via a bus. For example, some memories may be connected via a system bus, or in a data center, memory may be accessible in a remote DMA (RDMA) configuration.

Memory 804 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 804 may be used for short, medium, and/or long-term storage. Memory 804 may store any suitable data or information utilized by platform logic. In some embodiments, memory 804 may also comprise storage for instructions that may be executed by the cores of processors 802 or other processing elements (e.g., logic resident on chipsets 816) to provide functionality.

In certain embodiments, memory 804 may comprise a relatively low-latency volatile main memory, while storage 850 may comprise a relatively higher-latency nonvolatile memory. However, memory 804 and storage 850 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 804 and storage 850, for example, in a single physical memory device, and in other cases, memory 804 and/or storage 850 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 822 may be configured to provide a human-readable visual output, such as a command-line interface (CLI) or graphical desktop such as Microsoft Windows, Apple OSX desktop, or a Unix/Linux X Window System-based desktop. Graphics adapter 822 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 822 may include a hardware graphics card, which may have its own memory and its own graphics processing unit (GPU).

Chipset 816 may be in communication with a bus 828 via an interface circuit. Bus 828 may have one or more devices that communicate over it, such as a bus bridge 832, I/O devices 835, accelerators 846, communication devices 840, and a keyboard and/or mouse 838, by way of nonlimiting example. In general terms, the elements of hardware platform 800 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 840 can broadly include any communication not covered by a network interface and the various I/O devices described herein. This may include, for example, various universal serial bus (USB), FireWire, Lightning, or other serial or parallel devices that provide communications.

I/O Devices 835 may be configured to interface with any auxiliary device that connects to hardware platform 800 but that is not necessarily a part of the core architecture of hardware platform 800. A peripheral may be operable to provide extended functionality to hardware platform 800, and may or may not be wholly dependent on hardware platform 800. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 842 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 832 may be in communication with other devices such as a keyboard/mouse 838 (or other input devices such as a touch screen, trackball, etc.), communication devices 840 (such as modems, network interface devices, peripheral interfaces such as PCI or PCIe, or other types of communication devices that may communicate through a network), audio I/O 842, and/or accelerators 846. In alternative embodiments, any portions of the bus architectures could be implemented with one or more PtP links.

Operating system 806 may be, for example, Microsoft Windows, Linux, UNIX, Mac OS X, iOS, MS-DOS, or an embedded or real-time operating system (including embedded or real-time flavors of the foregoing). In some embodiments, a hardware platform 800 may function as a host platform for one or more guest systems that invoke application (e.g., operational agents 808).

Operational agents 808 may include one or more computing engines that may include one or more non-transitory computer-readable mediums having stored thereon executable instructions operable to instruct a processor to provide operational functions. At an appropriate time, such as upon booting hardware platform 800 or upon a command from operating system 806 or a user or security administrator, a processor 802 may retrieve a copy of the operational agent (or software portions thereof) from storage 850 and load it into memory 804. Processor 802 may then iteratively execute the instructions of operational agents 808 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 800 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 800 may be virtualized, in particular the processor(s) and memory. For example, a virtualized environment may run on OS 806, or OS 806 could be replaced with a hypervisor or virtual machine manager. In this configuration, a virtual machine running on hardware platform 800 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 8 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 9. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 9:
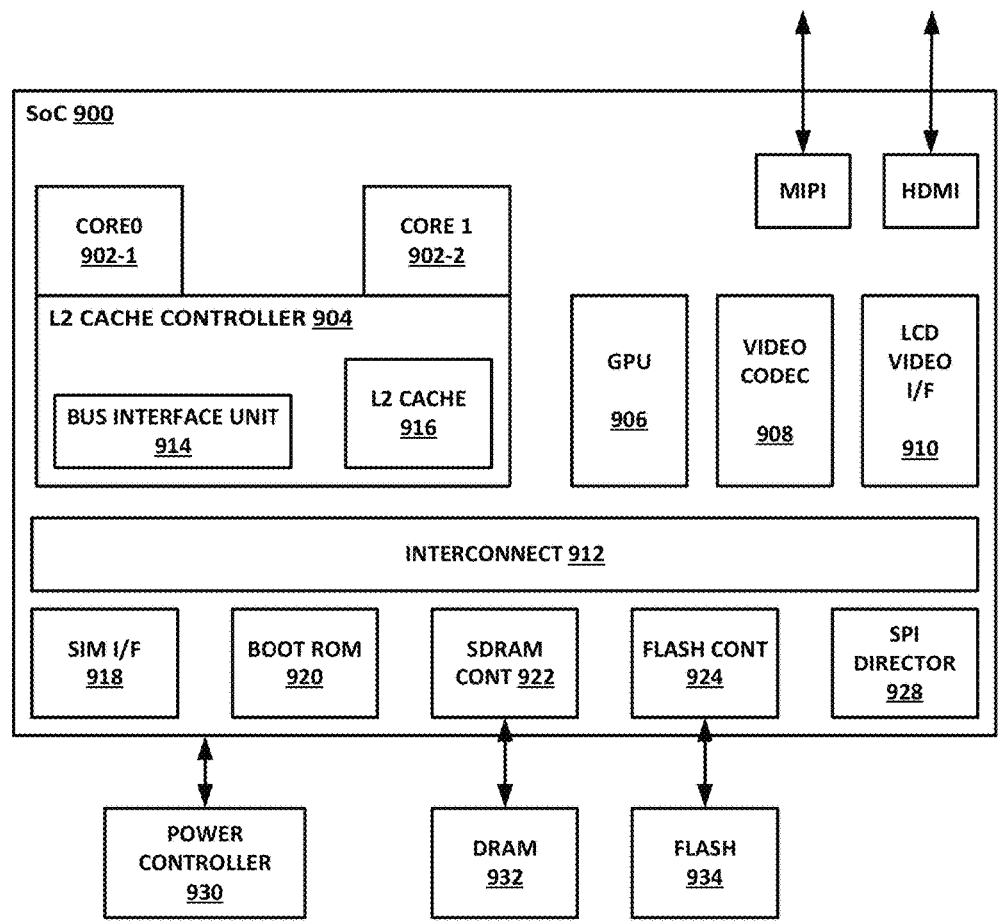
FIG. 9 is a block diagram of selected elements of a system-on-a-chip (SoC).

FIG. 9 is a block diagram illustrating selected elements of an example SoC 900. In at least some embodiments, SoC 900 may be programmed, configured, or otherwise adapted to provide multi-dimensional malware analysis, according to the teachings of the present specification.

At least some of the teachings of the present specification may be embodied on an SoC 900, or may be paired with an SoC 900. SoC 900 may include, or may be paired with, an advanced reduced instruction set computer machine (ARM) component. For example, SoC 900 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 900 could also be integrated into, for example, a PC, server, video processing components, laptop computer, notebook computer, netbook, or touch-enabled device.

As with hardware platform 800 above, SoC 900 may include multiple cores 902-1 and 902-2. In this illustrative example, SoC 900 also includes an L2 cache control 904, a GPU 906, a video codec 908, a liquid crystal display (LCD) I/F 910 and an interconnect 912. L2 cache control 904 can include a bus interface unit 914, a L2 cache 916. Liquid crystal display (LCD) I/F 910 may be associated with mobile industry processor interface (MIPI)/HDMI links that couple to an LCD.

SoC 900 may also include a subscriber identity module (SIM) I/F 918, a boot ROM 920, a synchronous dynamic random access memory (SDRAM) controller 922, a flash controller 924, a serial peripheral interface (SPI) director 928, a suitable power control 930, a dynamic RAM (DRAM) 932, and flash 934. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 900 (or other integrated circuits) may use intellectual property blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 10 is a block diagram illustrating selected elements of a processor 1000. In at least some embodiments, processor 1000 may be programmed (including via microcode), configured, or otherwise adapted to provide multi-dimensional malware analysis, according to the teachings of the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction-set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1000 may include any number of processing elements, which may be symmetrical or asymmetrical.

As used throughout this specification and the appended claims, a "hardware platform" identifies a genus of hardware devices, such as those commonly known as "von Neumann" machines. In general terms, a hardware platform includes at least one processor, and at least one memory. The memory may be split into volatile or main memory, and nonvolatile or slower memory that is used for storage. However, this split in memory is not necessary, and in some hardware platforms, a single memory structure is used. The hardware platform genus includes a wide range of devices, spanning from single-purpose embedded computers running on an ASIC, or running on a special purpose processor or DSP, and also includes devices such as smartphones, tablets, laptop computers, two-in-one computers, desktop computers, standalone servers, and various classes of enterprise or data center devices. These may include a virtualized infrastructure, wherein certain network functions are provided via network function virtualization (NFV), and wherein the "computer" may be implemented as a virtual machine or a container running on a host architecture. This also includes so-called infrastructure as a service (IaaS), wherein devices may be provided in a disaggregated architecture. In the IaaS context, the processor, memory, storage, accelerators, and peripheral devices need not even be located on the same physical device. For example, in a disaggregated architecture, a processor may be provisioned from a processor bank, memory may be provisioned from a memory bank, storage may be provisioned from a storage bank, and accelerators may be provisioned from an accelerator bank. These may be connected only in the sense that they are connected by very fast networking interfaces, and may be located on the same server rack, or even on different server racks in different locations.

At some level, these various hardware platforms ultimately map to instructions executing on a processor, or other processing circuit. On an ASIC, the instructions may be encoded into the hardware itself, whereas in a typical von Neumann machine, the instructions are loaded from a main memory. Even in a virtualized architecture, a virtualized memory location ultimately maps to a physical memory, and even in cases where multiple VMs are running on the same host hardware, the VM operating the algorithm of interest to a particular embodiment at some point takes ownership of a physical processor—even temporarily—and executes its instructions on that processor. Thus, the term hardware architecture should be understood to broadly encompass any of these embodiments. In cases where a particular species of hardware architecture is intended, that hardware architecture may be identified more specifically, such as via terms like "smart phone" or "tablet." Otherwise, it may be broadly understood that any computing apparatus of the present specification may run on any of the hardware platforms described herein.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an IC, which potentially includes any number of other processing elements, such as cores or hardware threads.

A core may refer to logic located on an IC capable of maintaining an independent architectural state, wherein each independently maintained architectural state is associated with at least some dedicated execution resources. A hardware thread may refer to any logic located on an IC capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1000 includes one or more processor cores 1002, including core 1002-1-1002-N. Cores 1002 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1000 may include at least one shared cache 1030, which may be treated logically as part of memory 1040. Memory 1040 may include executable instructions 1042, as illustrated. Caches 1030 may be filled according to known caching techniques, and may store instructions and/or data that may be used by one or more components of processor 1000.

Processor 1000 may include an integrated memory controller (MC) 1034, to communicate with memory 1040. Memory controller 1034 may include logic and circuitry to interface with memory 1040, and may also include a cache controller to handle filling and evicting instructions and data to and from cache 1030.

By way of example, each core 1002 may include front-end logic 1006, execution logic 1014, and backend logic 1018.

In the illustrated embodiment, front-end logic 1006 includes an instruction decoder or decoders 1008, register renaming logic 1010, and scheduling logic 1012. Decoder 1008 may decode instructions received. Register renaming logic 1010 may provide register renaming, for example to facilitate pipelining. Scheduling logic 1012 may schedule instruction execution, and may provide out-of-order (OOO) execution. Front-end logic 1006 may fetch incoming instructions, perform various processing (e.g., caching, decoding, branch predicting, etc.), and pass instructions to execution logic 1014.

Execution logic 1014 includes one or more execution units 1016-1-1016-N. Execution units 1016 may include hardware instructions and microcode to carry out the provided instructions.

Backend logic 1018 includes retirement logic 1020. Core 1002 may provide for speculative execution of instructions, branch prediction, and similar. Retirement logic 1020 may be configured to determine which predicted instructions were actually needed by the program flow.

Processor 1000 may also include a PtP controller 1032, which enables connection to an uncore, chipset, Northbridge, Southbridge, or bus, by way of example.

Figure 11:
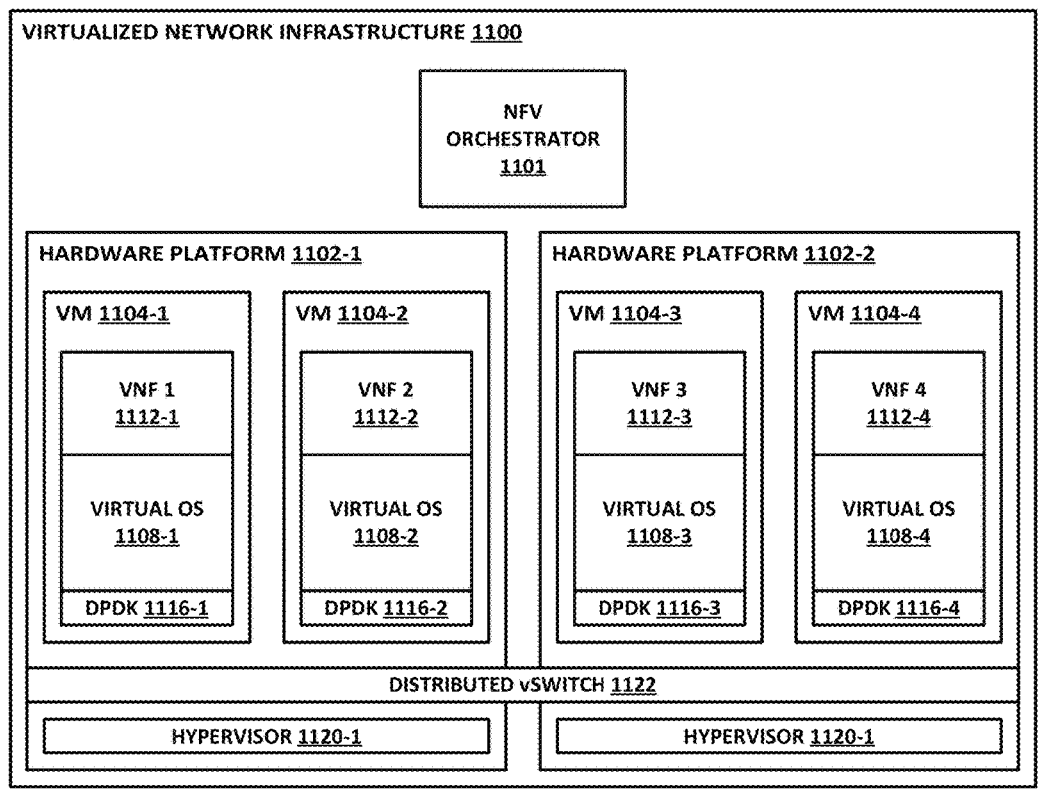
FIG. 11 is a block diagram of selected elements of a network function virtualization (NFV) infrastructure.

FIG. 11 is a block diagram of a network function virtualization (NFV) infrastructure 1100. FIG. 11 illustrates a platform for providing virtualization services. Virtualization may be used in some embodiments to provide one or more features of the present disclosure.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 1100. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 11, an NFV orchestrator 1101 manages a number of the VNFs 1112 running on an NFVI 1100. NFV requires non-trivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1101 a valuable system resource. Note that NFV orchestrator 1101 may provide a browser-based or graphical configuration interface, and in some embodiments may be integrated with SDN orchestration functions.

Note that NFV orchestrator 1101 itself may be virtualized (rather than a special-purpose hardware appliance). NFV orchestrator 1101 may be integrated within an existing SDN system, wherein an operations support system (OSS) manages the SDN. This may interact with cloud resource management systems (e.g., OpenStack) to provide NFV orchestration. An NFVI 1100 may include the hardware, software, and other infrastructure to enable VNFs to run. This may include a hardware platform 1102 on which one or more VMs 1104 may run. For example, hardware platform 1102-1 in this example runs VMs 1104-1 and 1104-2. Hardware platform 1102-2 runs VMs 1104-3 and 1104-4. Each hardware platform may include a hypervisor 1120, virtual machine manager (VMM), or similar function, which may include and run on a native (bare metal) operating system, which may be minimal so as to consume very few resources.

Hardware platforms 1102 may be or comprise a rack or several racks of blade or slot servers (including, e.g., processors, memory, and storage), one or more data centers, other hardware resources distributed across one or more geographic locations, hardware switches, or network interfaces. An NFVI 1100 may also include the software architecture that enables hypervisors to run and be managed by NFV orchestrator 1101.

Running on NFVI 1100 are a number of VMs 1104, each of which in this example is a VNF providing a virtual service appliance. Each VM 1104 in this example includes an instance of the Data Plane Development Kit (DPDK), a virtual operating system 1108, and an application providing the VNF 1112.

Virtualized network functions could include, as nonlimiting and illustrative examples, firewalls, intrusion detection systems, load balancers, routers, session border controllers, DPI services, network address translation (NAT) modules, or call security association.

The illustration of FIG. 11 shows that a number of VNFs 1104 have been provisioned and exist within NFVI 1100. This FIGURE does not necessarily illustrate any relationship between the VNFs and the larger network, or the packet flows that NFVI 1100 may employ.

The illustrated DPDK instances 1116 provide a set of highly-optimized libraries for communicating across a virtual switch (vSwitch) 1122. Like VMs 1104, vSwitch 1122 is provisioned and allocated by a hypervisor 1120. The hypervisor uses a network interface to connect the hardware platform to the data center fabric (e.g., an HFI). This HFI may be shared by all VMs 1104 running on a hardware platform 1102. Thus, a vSwitch may be allocated to switch traffic between VMs 1104. The vSwitch may be a pure software vSwitch (e.g., a shared memory vSwitch), which may be optimized so that data are not moved between memory locations, but rather, the data may stay in one place, and pointers may be passed between VMs 1104 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1122 is illustrated, wherein vSwitch 1122 is shared between two or more physical hardware platforms 1102.

Figure 12:
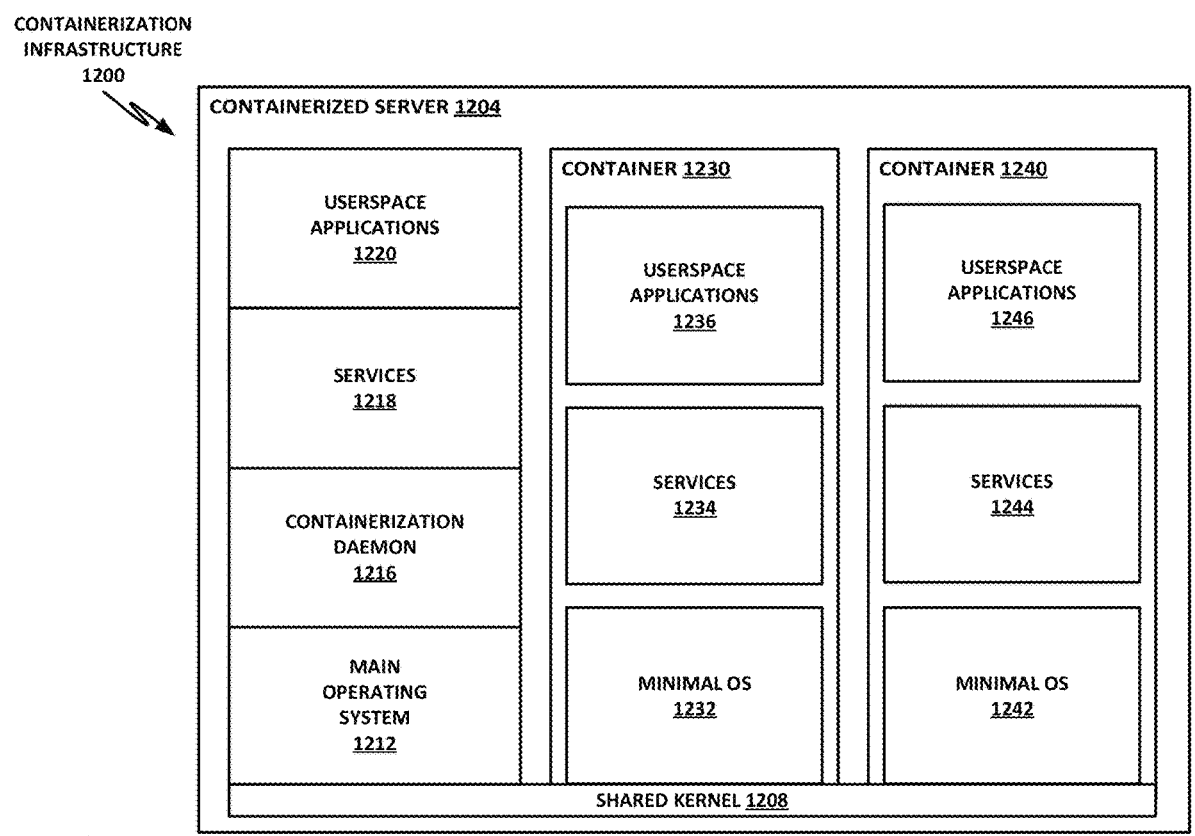
FIG. 12 is a block diagram of selected elements of a containerization infrastructure.

FIG. 12 is a block diagram of selected elements of a containerization infrastructure 1200. FIG. 12 illustrates a platform for providing containerization services. Containerization may be used in some embodiments to provide one or more features of the present disclosure. Like virtualization, containerization is a popular form of providing a guest infrastructure.

Containerization infrastructure 1200 runs on a hardware platform such as containerized server 1204. Containerized server 1204 may provide a number of processors, memory, one or more network interfaces, accelerators, and/or other hardware resources.

Running on containerized server 1204 is a shared kernel 1208. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 1208 is main operating system 1212. Commonly, main operating system 1212 is a Unix or Linux-based operating system, although containerization infrastructure is also available for other types of systems, including Microsoft Windows systems and Macintosh systems. Running on top of main operating system 1212 is a containerization layer 1216. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main operating system 1212 may also include a number of services 1218, which provide services and interprocess communication to userspace applications 1220.

Services 1218 and userspace applications 1220 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 1212, they inherit the same file and resource access permissions as those provided by shared kernel 1208. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1204, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1204).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1204 hosts two containers, namely container 1230 and container 1240.

Container 1230 may include a minimal operating system 1232 that runs on top of shared kernel 1208. Note that a minimal operating system is provided as an illustrative example, and is not mandatory. In fact, container 1230 may perform as full an operating system as is necessary or desirable. Minimal operating system 1232 is used here as an example simply to illustrate that in common practice, the minimal operating system necessary to support the function of the container (which in common practice, is a single or monolithic function) is provided.

On top of minimal operating system 1232, container 1230 may provide one or more services 1234. Finally, on top of services 1234, container 1230 may also provide a number of userspace applications 1236, as necessary.

Container 1240 may include a minimal operating system 1242 that runs on top of shared kernel 1208. Note that a minimal operating system is provided as an illustrative example, and is not mandatory. In fact, container 1240 may perform as full an operating system as is necessary or desirable. Minimal operating system 1242 is used here as an example simply to illustrate that in common practice, the minimal operating system necessary to support the function of the container (which in common practice, is a single or monolithic function) is provided.

On top of minimal operating system 1242, container 1240 may provide one or more services 1244. Finally, on top of services 1244, container 1240 may also provide a number of userspace applications 1246, as necessary.

Using containerization layer 1216, containerized server 1204 may run a number of discrete containers, each one providing the minimal operating system and/or services necessary to provide a particular function. For example, containerized server 1204 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

Figure 13:
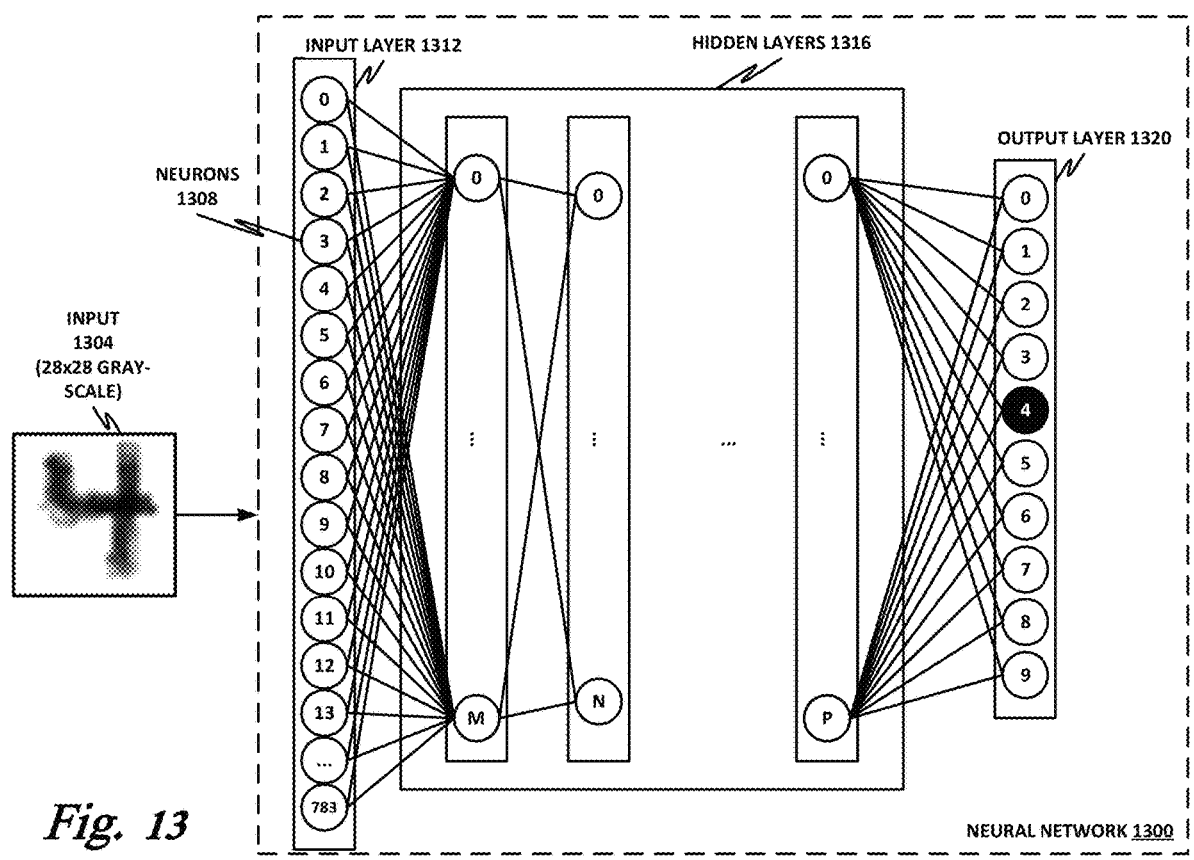
FIG. 13 illustrates machine learning according to a "textbook" problem with real-world applications.
Figure 14:
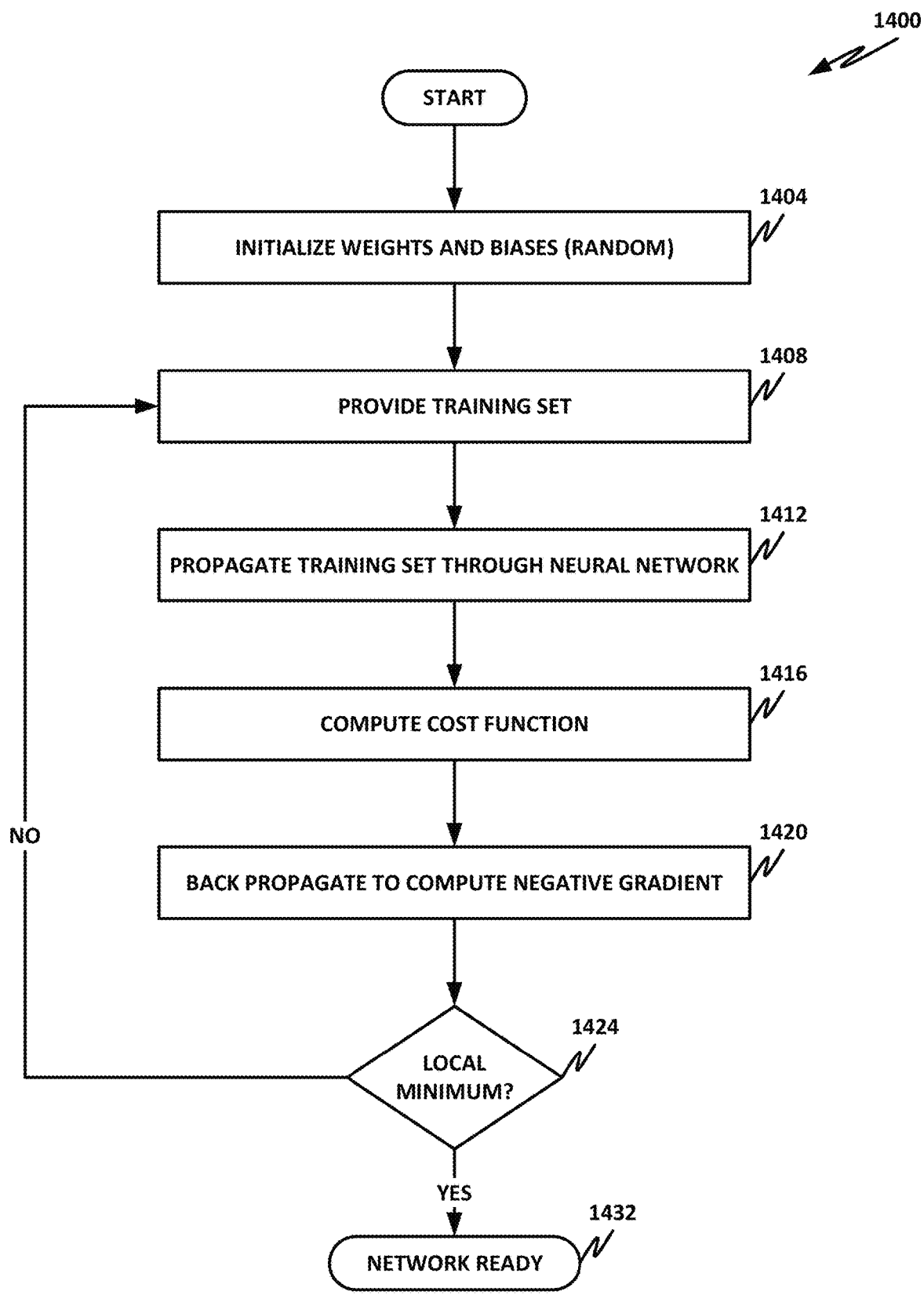
FIG. 14 is a flowchart of a method that may be used to train a neural network.
Figure 15:
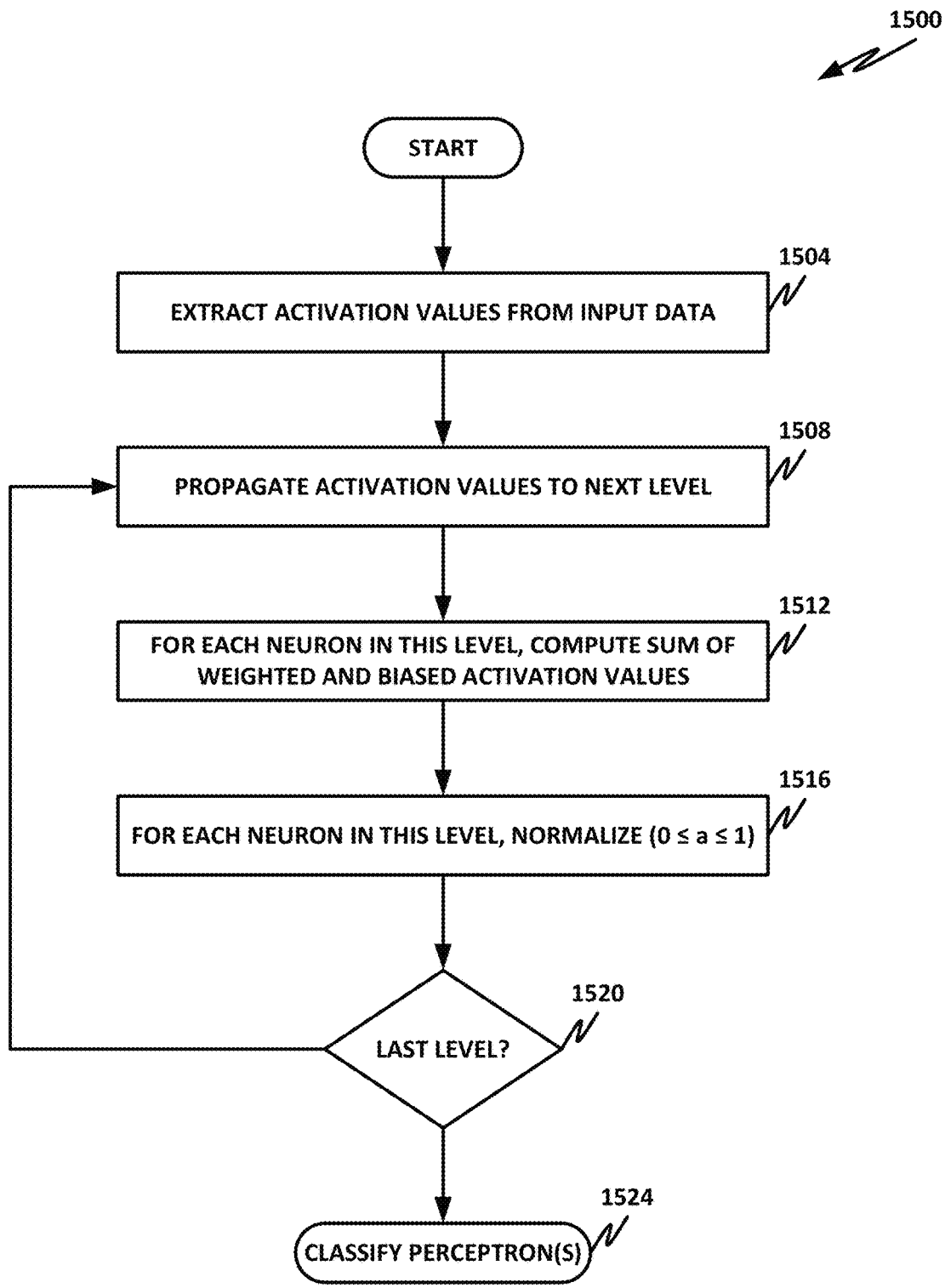
FIG. 15 is a flowchart of a method of using a neural network to classify an object.

FIGS. 13-15 illustrate selected elements of an artificial intelligence system or architecture. In these FIGURES, an elementary neural network is used as a representative embodiment of an artificial intelligence or machine learning architecture or engine. This should be understood to be a nonlimiting example, and other machine learning or artificial intelligence architectures are available, including for example symbolic learning, robotics, computer vision, pattern recognition, statistical learning, speech recognition, natural language processing, deep learning, convolutional neural networks, recurrent neural networks, object recognition and/or others.

FIG. 13 illustrates machine learning according to a "textbook" problem with real-world applications. In this case, a neural network 1300 is tasked with recognizing characters.

To simplify the description, neural network 1300 is tasked only with recognizing single digits in the range of 0 through 9. These are provided as an input image 1304. In this example, input image 1304 is a 28×28-pixel 8-bit grayscale image. In other words, input image 1304 is a square that is 28 pixels wide and 28 pixels high. Each pixel has a value between 0 and 255, with 0 representing white or no color, and 255 representing black or full color, with values in between representing various shades of gray. This provides a straightforward problem space to illustrate the operative principles of a neural network. It should be understood that only selected elements of neural network 1300 are illustrated in this FIGURE, and that real-world applications may be more complex, and may include additional features. Additional layers of complexity or functions may be provided in a neural network, or other artificial intelligence architecture, to meet the demands of a particular problem. Indeed, the architecture here is sometimes referred to as the "Hello World" problem of machine learning, and is provided here as but one example of how the machine learning or artificial intelligence functions of the present specification could be implemented.

In this case, neural network 1300 includes an input layer 1312 and an output layer 1320. In principle, input layer 1312 receives an input such as input image 1304, and at output layer 1320, neural network 1300 "lights up" a perceptron that indicates which character neural network 1300 thinks is represented by input image 1304.

Between input layer 1312 and output layer 1320 are some number of hidden layers 1316. The number of hidden layers 1316 will depend on the problem to be solved, the available compute resources, and other design factors. In general, the more hidden layers 1316, and the more neurons per hidden layer, the more accurate the neural network 1300 may become. However, adding hidden layers and neurons also increases the complexity of the neural network, and its demand on compute resources. Thus, some design skill is required to determine the appropriate number of hidden layers 1316, and how many neurons are to be represented in each hidden layer 1316.

Input layer 1312 includes, in this example, 784 "neurons" 1308. Each neuron of input layer 1312 receives information from a single pixel of input image 1304. Because input image 1304 is a 28×28 grayscale image, it has 784 pixels. Thus, each neuron in input layer 1312 holds 8 bits of information, taken from a pixel of input layer 1304. This 8-bit value is the "activation" value for that neuron.

Each neuron in input layer 1312 has a connection to each neuron in the first hidden layer in the network. In this example, the first hidden layer has neurons labeled 0 through M. Each of the M+1 neurons is connected to all 784 neurons in input layer 1312. Each neuron in hidden layer 1316 includes a kernel or transfer function, which is described in greater detail below. The kernel or transfer function determines how much "weight" to assign each connection from input layer 1312. In other words, a neuron in hidden layer 1316 may think that some pixels are more important to its function than other pixels. Based on this transfer function, each neuron computes an activation value for itself, which may be for example a decimal number between 0 and 1.

Each neuron in this layer is also connected to each neuron in the next layer, which has neurons from 0 to N. As in the previous layer, each neuron has a transfer function that assigns a particular weight to each of its M+1 connections, and computes its own activation value. In this manner, values are propagated along hidden layers 1316, until they reach the last layer, which has P+1 neurons labeled 0 through P. Each of these P+1 neurons has a connection to each neuron in output layer 1320. Output layer 1320 includes a number of neurons known as perceptrons that compute an activation value based on their weighted connections to each neuron in the last hidden layer 1316. The final activation value computed at output layer 1320 may be thought of as a "probability" that input image 1304 is the value represented by the perceptron. For example, if neural network 1300 operates perfectly, then perceptron 4 would have a value of 1.00, while each other perceptron would have a value of 0.00. This would represent a theoretically perfect detection. In practice, detection is not generally expected to be perfect, but it is desirable for perceptron 4 to have a value close to 1, while the other perceptrons have a value close to 0.

Conceptually, neurons in the hidden layers 1316 may correspond to "features." For example, in the case of computer vision, the task of recognizing a character may be divided into recognizing features such as the loops, lines, curves, or other features that make up the character. Recognizing each loop, line, curve, etc., may be further divided into recognizing smaller elements (e.g., line or curve segments) that make up that feature. Moving through the hidden layers from left to right, it is often expected and desired that each layer recognizes the "building blocks" that make up the features for the next layer. In practice, realizing this effect is itself a non-trivial problem, and may require greater sophistication in programming and training than is fairly represented in this simplified example.

The activation value for neurons in the input layer is simply the value taken from the corresponding pixel in the bitmap. The activation value (a) for each neuron in succeeding layers is computed according to a transfer function, which accounts for the "strength" of each of its connections to each neuron in the previous layer. The transfer can be written as a sum of weighted inputs (i.e., the activation value (a) received from each neuron in the previous layer, multiplied by a weight representing the strength of the neuron-to-neuron connection (w)), plus a bias value.

The weights may be used, for example, to "select" a region of interest in the pixmap that corresponds to a "feature" that the neuron represents. Positive weights may be used to select the region, with a higher positive magnitude representing a greater probability that a pixel in that region (if the activation value comes from the input layer) or a subfeature (if the activation value comes from a hidden layer) corresponds to the feature. Negative weights may be used for example to actively "de-select" surrounding areas or subfeatures (e.g., to mask out lighter values on the edge), which may be used for example to clean up noise on the edge of the feature. Pixels or subfeatures far removed from the feature may have for example a weight of zero, meaning those pixels should not contribute to examination of the feature.

The bias (b) may be used to set a "threshold" for detecting the feature. For example, a large negative bias indicates that the "feature" should be detected only if it is strongly detected, while a large positive bias makes the feature much easier to detect.

The biased weighted sum yields a number with an arbitrary sign and magnitude. This real number can then be normalized to a final value between 0 and 1, representing (conceptually) a probability that the feature this neuron represents was detected from the inputs received from the previous layer. Normalization may include a function such as a step function, a sigmoid, a piecewise linear function, a Gaussian distribution, a linear function or regression, or the popular "rectified linear unit" (ReLU) function. In the examples of this specification, a sigmoid function notation (a) is used by way of illustrative example, but it should be understood to stand for any normalization function or algorithm used to compute a final activation value in a neural network.

The transfer function for each neuron in a layer yields a scalar value. For example, the activation value for neuron "0" in layer "1" (the first hidden layer), may be written as:

$$a_0^{(1)} = \sigma(w_0 a_0^{(0)} + w_1 a_1^{(0)} + \ldots w_{783} a_{783}^{(0)} + b)$$

In this case, it is assumed that layer 0 (input layer 1312) has 784 neurons. Where the previous layer has "n" neurons, the function can be generalized as:

$$a_0^{(1)} = \sigma(w_0 a_0^{(0)} + w_1 a_1^{(0)} + \ldots w_n a_n^{(0)} + b)$$

A similar function is used to compute the activation value of each neuron in layer 1 (the first hidden layer), weighted with that neuron's strength of connections to each neuron in layer 0, and biased with some threshold value. As discussed above, the sigmoid function shown here is intended to stand for any function that normalizes the output to a value between 0 and 1.

The full transfer function for layer 1 (with k neurons in layer 1) may be written in matrix notation as:

$$a^{(1)} = \sigma\left(\begin{bmatrix} w_{0,0} & \cdots & w_{0,n} \\ \vdots & \ddots & \vdots \\ w_{(k,0)} & \cdots & w_{k,n} \end{bmatrix} \begin{bmatrix} a_0^{(0)} \\ \vdots \\ a_n^{(0)} \end{bmatrix} + \begin{bmatrix} b_0 \\ \vdots \\ b_n \end{bmatrix}\right)$$

More compactly, the full transfer function for layer 1 can be written in vector notation as:

$$a^{(1)} = \sigma(Wa^{(0)} + b)$$

Neural connections and activation values are propagated throughout the hidden layers 1316 of the network in this way, until the network reaches output layer 1320. At output layer 1320, each neuron is a "bucket" or classification, with the activation value representing a probability that the input object should be classified to that perceptron. The classifications may be mutually exclusive or multinominal. For example, in the computer vision example of character recognition, a character may best be assigned only one value, or in other words, a single character is not expected to be simultaneously both a "4" and a "9." In that case, the neurons in output layer 1320 are binomial perceptrons. Ideally, only one value is above the threshold, causing the perceptron to metaphorically "light up," and that value is selected. In the case where multiple perceptrons "light up,"

the one with the highest probability may be selected. The final result is that only one value (in this case, "4") should be "lit up," while the rest should be "dark." Indeed, if the neural network were perfect, the "4" neuron would have an activation value of 1.00, while each other neuron would have an activation value of 0.00.

In the case of multinominal perceptrons, more than one output may be "lit up." For example, a neural network may determine that a particular document has high activation values for perceptrons corresponding to several departments, such as Accounting, Information Technology (IT), and Human Resources. On the other hand, the activation values for perceptrons for Legal, Manufacturing, and Shipping are low. In the case of multinominal classification, a threshold may be defined, and any neuron in the output layer with a probability above the threshold may be considered a "match" (e.g., the document is relevant to those departments). Those below the threshold are considered not a match (e.g., the document is not relevant to those departments).

The weights and biases of the neural network act as parameters, or "controls," wherein features in a previous layer are detected and recognized. When the neural network is first initialized, the weights and biases may be assigned randomly or pseudo-randomly. Thus, because the weights-and-biases controls are garbage, the initial output is expected to be garbage. In the case of a "supervised" learning algorithm, the network is refined by providing a "training" set, which includes a number of objects with known results. Because the "right" answer for each object is known, training sets can be used to iteratively move the weights and biases away from garbage values, and toward more useful values.

A common method for refining values includes "gradient descent" and "back-propagation." An illustrative gradient descent method includes computing a "cost" function, which measures the error in the network. For example, in the illustration, the "4" perceptron ideally has a value of "1.00," while the other perceptrons have an ideal value of "0.00." The cost function takes the difference between each output and its ideal value, squares the difference, and then takes a sum of all of the differences. Each training example will have its own computed cost. Initially, the cost function is very large, because the network doesn't know how to classify objects. As the network is trained and refined, the cost function value is expected to get smaller, as the weights and biases are adjusted toward more useful values.

With, for example, 100,000 training examples in play, an average cost (e.g., a mathematical mean) can be computed across all 100,00 training examples. This average cost provides a quantitative measurement of how "badly" the neural network is doing its detection job.

The cost function can thus be thought of as a single, very complicated formula, where the inputs are the parameters (weights and biases) of the network. Because the network may have thousands or even millions of parameters, the cost function has thousands or millions of input variables. The output is a single value representing a quantitative measurement of the error of the network. The cost function can be represented as:

$$C(w)$$

Wherein w is a vector containing all of the parameters (weights and biases) in the network. The minimum (absolute and/or local) can then be represented as a trivial calculus problem, namely:

$$\frac{dC}{dw}(w) = 0$$

Solving such a problem symbolically may be prohibitive, and in some cases not even possible, even with heavy computing power available. Rather, neural networks commonly solve the minimizing problem numerically. For example, the network can compute the slope of the cost function at any given point, and then shift by some small amount depending on whether the slope is positive or negative. The magnitude of the adjustment may depend on the magnitude of the slope. For example, when the slope is large, it is expected that the local minimum is "far away," so larger adjustments are made. As the slope lessens, smaller adjustments are made to avoid badly overshooting the local minimum. In terms of multi-vector calculus, this is a gradient function of many variables:

$$-\nabla C(w)$$

The value of $-\nabla C$ is simply a vector of the same number of variables as w, indicating which direction is "down" for this multivariable cost function. For each value in $-\nabla C$, the sign of each scalar tells the network which "direction" the value needs to be nudged, and the magnitude of each scalar can be used to infer which values are most "important" to change.

Gradient descent involves computing the gradient function, taking a small step in the "downhill" direction of the gradient (with the magnitude of the step depending on the magnitude of the gradient), and then repeating until a local minimum has been found within a threshold.

While finding a local minimum is relatively straightforward once the value of $-\nabla C$, finding an absolutely minimum is many times harder, particularly when the function has thousands or millions of variables. Thus, common neural networks consider a local minimum to be "good enough," with adjustments possible if the local minimum yields unacceptable results. Because the cost function is ultimately an average "error" value over the entire training set, minimizing the cost function yields a (locally) lowest average error.

In many cases, the most difficult part of gradient descent is computing the value of $-\nabla C$. As mentioned above, computing this symbolically or exactly would be prohibitively difficult. A more practical method is to use "back-propagation" to numerically approximate a value for $-\nabla C$. Back-propagation may include, for example, examining an individual perceptron at the output layer, and determining an average cost value for that perceptron across the whole training set. Taking the "4" perceptron as an example, if the input image is a 4, it is desirable for the perceptron to have a value of 1.00, and for any input images that are not a 4, it is desirable to have a value of 0.00. Thus, an overall or average desired adjustment for the "4" perceptron can be computed.

However, the perceptron value is not hard-coded, but rather depends on the activation values received from the previous layer. The parameters of the perceptron itself (weights and bias) can be adjusted, but it may also be desirable to receive different activation values from the previous layer. For example, where larger activation values are received from the previous layer, the weight is multiplied by a larger value, and thus has a larger effect on the final activation value of the perceptron. The perceptron essentially "wishes" that certain activations from the previous layer were larger or smaller. Those "wishes" can be back-propagated to the previous-layer neurons.

At the next layer, the neuron takes into account the "wishes" from the next downstream layer in determining its own "preferred" activation value. Again, at this layer, the activation values are not hard-coded. Each neuron can adjust its own weights and biases, and then back-propagate changes to the activation values that it "wishes" would occur. The back-propagation continues, layer by layer, until the weights and biases of the first hidden layer are set. This layer cannot back-propagate desired changes to the input layer, because the input layer receives activation values directly from the input image.

After a round of "nudging," the network may receive another round of training with the same or a different training data set, and the process is repeated until a local and/or global minimum value is found for the cost function.

FIG. 14 is a flowchart of a method 1400. Method 1400 may be used to train a neural network, such as neural network 1300 of FIG. 13.

In block 1404, the network is initialized. Initially, neural network 1300 includes some number of neurons. Each neuron includes a transfer function or kernel. In the case of a neural network, each neuron includes parameters such as the weighted sum of values of each neuron from the previous layer, plus a bias. The final value of the neuron may be normalized to a value between 0 and 1, using a function such as the sigmoid or ReLU. Because the untrained neural network knows nothing about its problem space, and because it would be very difficult to manually program the neural network to perform the desired function, the parameters for each neuron may initially be set to just some random value. For example, the values may be selected using a pseudorandom number generator of a CPU, and then assigned to each neuron.

In block 1408, the neural network is provided a training set. In some cases, the training set may be divided up into smaller groups. For example, if the training set has 100,000 objects, this may be divided into 1,000 groups, each having 100 objects. These groups can then be used to incrementally train the neural network. In block 1408, the initial training set is provided to the neural network. Alternatively, the full training set could be used in each iteration.

In block 1412, the training data are propagated through the neural network. Because the initial values are random, and are therefore essentially garbage, it is expected that the output will also be a garbage value. In other words, if neural network 1300 of FIG. 13 has not been trained, when input image 1304 is fed into the neural network, it is not expected with the first training set that output layer 1320 will light up perceptron 4. Rather, the perceptrons may have values that are all over the map, with no clear winner, and with very little relation to the number 4.

In block 1416, a cost function is computed as described above. For example, in neural network 1300, it is desired for perceptron 4 to have a value of 1.00, and for each other perceptron to have a value of 0.00. The difference between the desired value and the actual output value is computed and squared. Individual cost functions can be computed for each training input, and the total cost function for the network can be computed as an average of the individual cost functions.

In block 1420, the network may then compute a negative gradient of this cost function to seek a local minimum value of the cost function, or in other words, the error. For example, the system may use back-propagation to seek a negative gradient numerically. After computing the negative gradient, the network may adjust parameters (weights and biases) by some amount in the "downward" direction of the negative gradient.

After computing the negative gradient, in decision block 1424, the system determines whether it has reached a local minimum (e.g., whether the gradient has reached 0 within the threshold). If the local minimum has not been reached, then the neural network has not been adequately trained, and control returns to block 1408 with a new training set. The training sequence continues until, in block 1424, a local minimum has been reached.

Now that a local minimum has been reached and the corrections have been back-propagated, in block 1432, the neural network is ready.

FIG. 15 is a flowchart of a method 1500. Method 1500 illustrates a method of using a neural network, such as network 1400 of FIG. 14, to classify an object.

In block 1504, the network extracts the activation values from the input data. For example, in the example of FIG. 14, each pixel in input image 1404 is assigned as an activation value to a neuron 1408 in input layer 1412.

In block 1508, the network propagates the activation values from the current layer to the next layer in the neural network. For example, after activation values have been extracted from the input image, those values may be propagated to the first hidden layer of the network.

In block 1512, for each neuron in the current layer, the neuron computes a sum of weighted and biased activation values received from each neuron in the previous layer. For example, in the illustration of FIG. 14, neuron 0 of the first hidden layer is connected to each neuron in input layer 1412. A sum of weighted values is computed from those activation values, and a bias is applied.

In block 1516, for each neuron in the current layer, the network normalizes the activation values by applying a function such as sigmoid, ReLU, or some other function.

In decision block 1520, the network determines whether it has reached the last layer in the network. If this is not the last layer, then control passes back to block 1508, where the activation values in this layer are propagated to the next layer.

Returning to decision block 1520, If the network is at the last layer, then the neurons in this layer are perceptrons that provide final output values for the object. In terminal 1524, the perceptrons are classified and used as output values.

Figure 16:
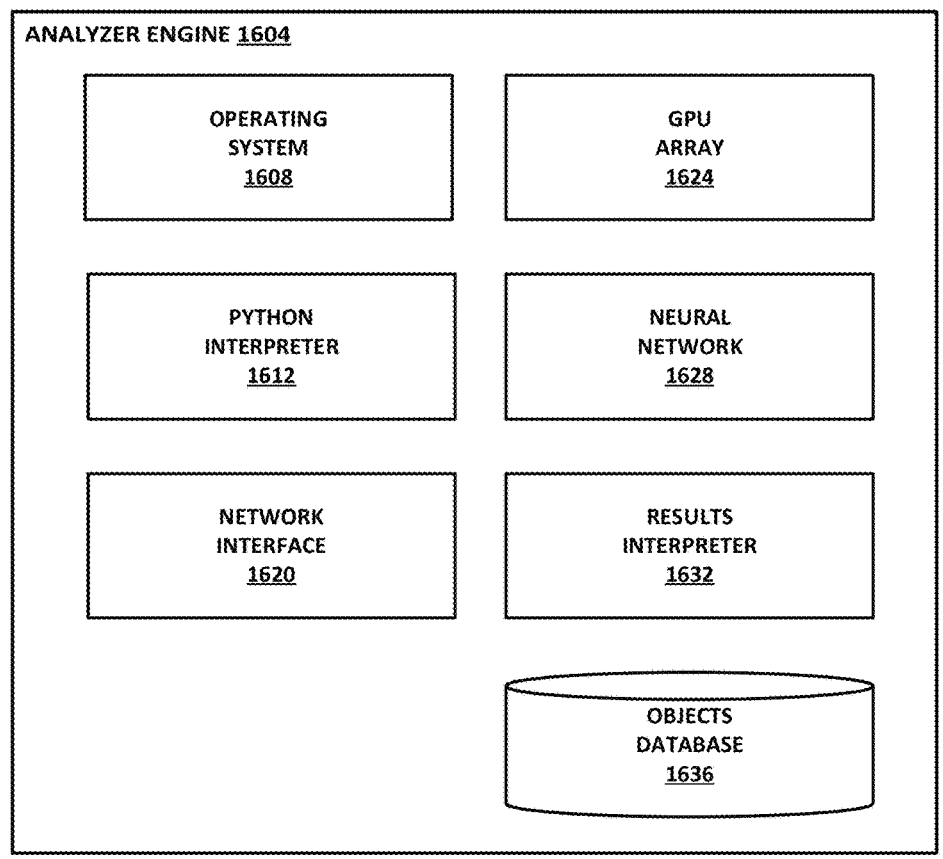
FIG. 16 is a block diagram illustrating selected elements of an analyzer engine.

FIG. 16 is a block diagram illustrating selected elements of an analyzer engine 1604. Analyzer engine 1604 may be configured to provide analysis services, such as via a neural network. FIG. 16 illustrates a platform for providing analysis services. Analysis, such as neural analysis and other machine learning models, may be used in some embodiments to provide one or more features of the present disclosure.

Note that analyzer engine 1604 is illustrated here as a single modular object, but in some cases, different aspects of analyzer engine 1604 could be provided by separate hardware, or by separate guests (e.g., virtual machines or containers) on a hardware system.

Analyzer engine 1604 includes an operating system 1608. Commonly, operating system 1608 is a Linux operating system, although other operating systems, such as Microsoft Windows, Mac OS X, or similar could be used. Analyzer engine 1604 also includes a Python interpreter 1612, which can be used to run Python programs. A Python module known as Numerical Python (NumPy) is often used for neural network analysis. Although this is a popular choice, other non-Python or non-NumPy-based systems could also be used. For example, the neural network could be implemented in Matrix Laboratory (MATLAB), C, C++, Fortran, R, or some other compiled or interpreted computer language.

GPU array 1624 may include an array of graphics processing units that may be used to carry out the neural network functions of neural network 1628. Note that GPU arrays are a popular choice for this kind of processing, but neural networks can also be implemented in CPUs, or in ASICs or FPGAs that are specially designed to implement the neural network.

Neural network 1628 includes the actual code for carrying out the neural network, and as mentioned above, is commonly programmed in Python.

Results interpreter 1632 may include logic separate from the neural network functions that can be used to operate on the outputs of the neural network to assign the object for particular classification, perform additional analysis, and/or provide a recommended remedial action.

Objects database 1636 may include a database of known malware objects and their classifications. Neural network 1628 may initially be trained on objects within objects database 1636, and as new objects are identified, objects database 1636 may be updated with the results of additional neural network analysis.

Once final results have been obtained, the results may be sent to an appropriate destination via network interface 1620.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, non-transitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or runtime memory (e.g., RAM), where instructions have already been loaded. These instructions, when fetched by the processor and executed, may provide methods or procedures as described herein.

In yet another embodiment, there may be one or more tangible, non-transitory computer-readable storage media having stored thereon executable instructions that, when executed, cause a hardware platform or other computing system, to carry out a method or procedure. For example, the instructions could be executable object code, including software instructions executable by a processor. The one or more tangible, non-transitory computer-readable storage media could include, by way of illustrative and nonlimiting example, a magnetic media (e.g., hard drive), a flash memory, a ROM, optical media (e.g., CD, DVD, Blu-Ray), nonvolatile RAM (NVRAM), nonvolatile memory (NVM) (e.g., Intel 3D Xpoint), or other non-transitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:
a hardware platform, comprising a processor, a memory, and a network interface;
a bucketized reputation modifier table; and
instructions encoded within the memory to instruct the processor to:
perform a feature-based malware analysis of an object;
assign the object a malware reputation according to the feature-based malware analysis;
query and receive via the network interface a complementary score for a complementary property of the object;
query the bucketized reputation modifier table according to the complementary score to receive a reputation modifier for the object;
adjust the object's reputation according to the reputation modifier; and
take a security action according to the adjusted reputation.

2. The computing apparatus of claim 1, wherein the feature-based malware analysis comprises static analysis.

3. The computing apparatus of claim 1, wherein the feature-based malware analysis comprises dynamic analysis.

4. The computing apparatus of claim 1, wherein the complementary property is a reputation prediction of the object.

5. The computing apparatus of claim 1, wherein the complementary property is an internet protocol (IP) address of the object.

6. The computing apparatus of claim 1, wherein the complementary property is a certificate of the object.

7. The computing apparatus of claim 1, wherein the complementary property is a uniform resource locator (URL) of the object.

8. The computing apparatus of claim 1, wherein taking the security action comprises comparing the object's adjusted reputation to a malware threshold.

9. The computing apparatus of claim 8, wherein adjusting the object's reputation comprises computing a difference between the threshold and the complementary score, and adjusting the object's reputation with the difference.

10. The computing apparatus of claim 1, wherein the bucketized reputation modifier table comprises buckets for complementary score ranges.

11. One or more tangible, non-transitory computer-readable media having stored thereon executable instructions to instruct a processor to:
receive a malware reputation score for a binary object;
receive a secondary score for the binary object;
query a bucketized table for a reputation adjustment factor for a range corresponding to the secondary score;
adjust the reputation score with the reputation adjustment factor;
compare the adjusted reputation score to a malware threshold; and
take a security action according to the comparison.

12. The one or more tangible, non-transitory computer-readable media of claim 11, wherein the instructions are further to compute the malware reputation score.

13. The one or more tangible, non-transitory computer-readable media of claim 12, wherein the instructions are further to instruct the processor to perform feature-based malware analysis, including static analysis.

14. The one or more tangible, non-transitory computer-readable media of claim 12, wherein the instructions are further to instruct the processor to perform feature-based malware analysis, including dynamic analysis.

15. The one or more tangible, non-transitory computer-readable media of claim 11, wherein the bucketized table comprises buckets for complementary score ranges.

16. The one or more tangible, non-transitory computer-readable media of claim 15, wherein the buckets include reputation modifiers derived from models for the buckets.

17. The one or more tangible, non-transitory computer-readable media of claim 16, wherein the buckets include options for a plurality of sensitivity thresholds.

18. The one or more tangible, non-transitory computer-readable media of claim 16, wherein the models comprise a machine learning model.

19. A computer-implemented method of performing a malware classification, comprising:
performing a first-phase feature-based analysis of an object, and assigning the object a first score;
receiving from a reputation database a second score for a complementary property of the object;
looking up a score adjustment factor according to the second score;
modifying the first score according to the score adjustment factor to yield a final score; and
comparing the final score to a malware threshold to determine if the object is malicious.

20. The computer-implemented method of claim 19, wherein the first-phase feature-based malware analysis comprises static analysis.

* * * * *